(12) United States Patent
Silverbrook

(10) Patent No.: US 6,460,971 B2
(45) Date of Patent: Oct. 8, 2002

(54) INK JET WITH HIGH YOUNG'S MODULUS ACTUATOR

(75) Inventor: Kia Silverbrook, Balmain (AU)

(73) Assignee: Silverbrook Research Pty Ltd, Balmain (AU)

(*) Notice: Subject to any disclaimer, the term of this patent is extended or adjusted under 35 U.S.C. 154(b) by 0 days.

(21) Appl. No.: 09/798,757

(22) Filed: Mar. 2, 2001

(65) Prior Publication Data

US 2001/0012035 A1 Aug. 9, 2001

Related U.S. Application Data

(63) Continuation-in-part of application No. 09/112,755, filed on Jul. 10, 1998.

(30) Foreign Application Priority Data

Jul. 15, 1997 (AU) .............................................. PO7991
Sep. 26, 1997 (AU) .............................................. PO9391

(51) Int. Cl.$^7$ ................................................. B41J 2/04
(52) U.S. Cl. ........................................................ 347/54
(58) Field of Search ............................. 347/55, 68, 69, 347/70, 71, 72, 50, 40, 20, 44, 47, 48; 399/261; 361/700; 310/328–330; 29/890.1; 216/4, 48, 27

(56) References Cited

U.S. PATENT DOCUMENTS

| | | | | |
|---|---|---|---|---|
| 1,941,001 A | * | 12/1933 | Hansell | |
| 3,373,437 A | * | 3/1968 | Sweet et al. | |
| 3,596,275 A | * | 7/1971 | Sweet | |
| 3,683,212 A | * | 8/1972 | Zolten | |
| 3,747,120 A | * | 7/1973 | Stemme | |
| 3,946,398 A | * | 3/1976 | Kyser et al. | |
| 4,459,601 A | * | 7/1984 | Howkins | |
| 4,490,728 A | * | 12/1984 | Vaught et al. | |
| 4,584,590 A | * | 4/1986 | Fischbeck et al. | |
| 5,322,594 A | | 6/1994 | Bol | |
| 5,719,604 A | | 2/1998 | Inui et al. | |
| 5,804,083 A | | 9/1998 | Ishii et al. | |
| 5,877,791 A | | 3/1999 | Lee et al. | |
| 5,897,789 A | | 4/1999 | Weber | |
| 5,912,684 A | | 6/1999 | Fujii et al. | |
| 5,922,218 A | | 7/1999 | Miyata et al. | |
| 6,087,638 A | * | 7/2000 | Silverbrook | |
| 6,171,875 B1 | * | 1/2001 | Silverbrook | |
| 6,180,427 B1 | * | 1/2001 | Silverbrook | |
| 6,217,183 B1 | * | 4/2001 | Silverbrook | |

(List continued on next page.)

FOREIGN PATENT DOCUMENTS

JP 404001051 1/1992

OTHER PUBLICATIONS

"An ink–jet Head Using Diaphragm Microactuator" by Hirata et al from Sharp Corporation, Jun. 1996, pp. 418–423.
"Micro Electro Mechanical systems" by Egawa et al, IEEE catalog No. 90CH2832–4, Feb. 1990, pp. 166–171.

Primary Examiner—Raquel Yvette Gordon

(57) ABSTRACT

An ink jet nozzle assembly includes a nozzle chamber having an inlet in fluid communication with an ink reservoir and a nozzle through which ink from the chamber can be ejected. The chamber includes a fixed portion and a movable portion configured for relative movement in an ejection phase and alternate relative movement in a refill phase. A thermal actuator connects with the movable portion and comprises materials having a high Young's modulus which produce a bending motion upon heating to effect periodically said relative movement. The inlet is positioned and dimensioned relative to the nozzle such that ink is ejected preferentially from the chamber through the nozzle in droplet form during the ejection phase, and ink is alternately drawn preferentially into the chamber from the reservoir through the inlet during the refill phase.

15 Claims, 36 Drawing Sheets

U.S. PATENT DOCUMENTS

| | | | |
|---|---|---|---|
| 6,220,694 B1 | * | 4/2001 | Silverbrook |
| 6,238,040 B1 | * | 5/2001 | Silverbrook |
| 6,239,821 B1 | * | 5/2001 | Silverbrook |
| 6,243,113 B1 | * | 6/2001 | Silverbrook |
| 6,244,691 B1 | * | 6/2001 | Silverbrook |
| 6,245,247 B1 | * | 6/2001 | Silverbrook |
| 6,247,790 B1 | * | 6/2001 | Silverbrook |
| 6,247,791 B1 | * | 6/2001 | Silverbrook |
| 6,247,792 B1 | * | 6/2001 | Silverbrook |
| 6,247,795 B1 | * | 6/2001 | Silverbrook |
| 6,247,796 B1 | * | 6/2001 | Silverbrook |
| 6,477,794 | * | 6/2001 | Silverbrook |
| 2001/0006394 A1 | * | 7/2001 | Silverbrook ................ 347/54 |
| 2001/0007461 A1 | * | 7/2001 | Silverbrook ................ 347/54 |
| 2001/0008406 A1 | * | 7/2001 | Silverbrook ................ 347/54 |
| 2001/0008409 A1 | * | 7/2001 | Silverbrook ................ 347/54 |
| 2001/0009430 A1 | * | 7/2001 | Silverbrook ................ 347/54 |

* cited by examiner

INK JET WITH HIGH YOUNG'S MODULUS ACTUATOR

This is a continuation-in-part of application Ser. No. 09/112,755, filed on Jul. 10, 1998.

FIELD OF THE INVENTION

The present invention relates to the field of inkjet printing and, in particular, discloses a High Young's Modulus Thermoelastic Inkjet Printer.

BACKGROUND OF THE INVENTION

Many different types of printing have been invented, a large number of which are presently in use. The known forms of print have a variety of methods for marking the print media with a relevant marking media. Commonly used forms of printing include offset printing, laser printing and copying devices, dot matrix type impact printers, thermal paper printers, film recorders, thermal wax printers, dye sublimation printers and ink jet printers both of the drop on demand and continuous flow type. Each type of printer has its own advantages and problems when considering cost, speed, quality, reliability, simplicity of construction and operation etc.

In recent years, the field of ink jet printing, wherein each individual pixel of ink is derived from one or more ink nozzles has become increasingly popular primarily due to its inexpensive and versatile nature.

Many different techniques on ink jet printing have been invented. For a survey of the field, reference is made to an article by J Moore, "Non-Impact Printing: Introduction and Historical Perspective", Output Hard Copy Devices, Editors R Dubeck and S Sherr, pages 207–220 (1988).

Ink Jet printers themselves come in many different types. The utilisation of a continuous stream of ink in ink jet printing appears to date back to at least 1929 wherein U.S. Pat. No. 1,941,001 by Hansell discloses a simple form of continuous stream electrostatic ink jet printing.

U.S. Pat. No. 3,596,275 by Sweet also discloses a process of a continuous ink jet printing including the step wherein the ink jet stream is modulated by a high frequency electrostatic field so as to cause drop separation. This technique is still utilized by several manufacturers including Elmjet and Scitex (see also U.S. Pat. No. 3,373,437 by Sweet et al) Piezo-electric ink jet printers are also one form of commonly utilized ink jet printing device. Piezo-electric systems are disclosed by Kyser et. al. in U.S. Pat. No. 3,946,398 (1970) which utilizes a diaphragm mode of operation, by Zolten in U.S. Pat. No. 3,683,212 (1970) which discloses a squeeze mode of operation of a piezo electric crystal, Stemme in U.S. Pat. No. 3,747,120 (1972) discloses a bend mode of piezo-electric operation, Howkins in U.S. Pat. No. 4,459,601 discloses a Piezo electric push mode actuation of the ink jet stream and Fischbeck in U.S. Pat. No. 4,584,590 which discloses a shear mode type of piezo-electric transducer element.

Recently, thermal ink jet printing has become an extremely popular form of ink jet printing. The ink jet printing techniques include those disclosed by Endo et al in GB 2007162 (1979) and Vaught et al in U.S. Pat. No. 4,490,728. Both the aforementioned references disclose ink jet printing techniques which rely upon the activation of an electrothermal actuator which results in the creation of a bubble in a constricted space, such as a nozzle, which thereby causes the ejection of ink from an aperture connected to the confined space onto a relevant print media. Printing devices utilizing the electro-thermal actuator are manufactured by manufacturers such as Canon and Hewlett Packard.

As can be seen from the foregoing, many different types of printing technologies are available. Ideally, a printing technology should have a number of desirable attributes. These include inexpensive construction and operation, high speed operation, safe and continuous long term operation etc. Each technology may have its own advantages and disadvantages in the areas of cost, speed, quality, reliability, power usage, simplicity of construction, operation, durability and consumables.

SUMMARY OF THE INVENTION

There is disclosed herein an ink jet nozzle assembly including a nozzle chamber having a nozzle through which ink from the chamber can be ejected, the chamber including a fixed portion and a movable portion configured for relative movement in an ejection phase and alternate relative movement in a refill phase, and an actuator connected with the movable portion and comprising materials having a Young's modulus greater than about 200 GPa.

There is further disclosed herein an ink jet nozzle assembly including: a nozzle chamber having an inlet in fluid communication with an ink reservoir and a nozzle through which ink from the chamber can be ejected;

the chamber including a fixed portion and a movable portion configured for relative movement in an ejection phase and alternate relative movement in a refill phase;

a thermal actuator connected with the movable portion and comprising materials having a high Young's modulus which produce a bending motion upon heating to effect periodically said relative movement; and the inlet being positioned and dimensioned relative to the nozzle such that ink is ejected preferentially from the chamber through the nozzle in droplet form during the ejection phase, and ink is alternately drawn preferentially into the chamber from the reservoir through the inlet during the refill phase;

wherein the movable portion includes the nozzle and the fixed portion is mounted on a substrate.

Preferably the fixed portion includes the nozzle mounted on a substrate and the movable portion includes an ejection paddle.

Preferably said thermal actuator is pivoted so as to increase a degree of travel of said ejection paddle upon actuation of said thermal actuator.

Preferably said actuator is of a horse-shoe shape pivoted substantially about a midpoint thereof.

Preferably said midpoint is constructed on a wall of said chamber.

Preferably said wall comprises a thinned membrane.

Preferably said thermal actuator operates in an ambient atmosphere.

Preferably said nozzle chamber is constructed on a silicon wafer and said ink is supplied through said silicon wafer.

Preferably said thermal actuator is constructed from a thin conductive section and a substantially thicker non-conductive section.

Preferably said thin conductive section comprises substantially titanium diboride.

Preferably said thicker portion comprises substantially glass.

Preferably said nozzle chamber walls include a number of small sacrificial etchant holes to facilitate construction of said assembly, said holes being of a diameter sufficiently small so as to prevent an ejection of ink therethrough.

Preferably the assembly is manufactured using micro-electro-mechanical systems (MEMS) techniques.

Preferably an effective volume of the chamber is reduced in said ejection phase and enlarged in said refill phase.

BRIEF DESCRIPTION OF THE DRAWINGS

Notwithstanding any other forms which may fall within the scope of the present invention, preferred forms of the invention will now be described, by way of example only, with reference to the accompanying drawings in which:

FIGS. 31a to 32c show sectional side views of an operation of the nozzle assembly manufactured according to the method of FIGS. 27 and 28.

DESCRIPTION OF PREFERRED AND OTHER EMBODIMENTS

Figure 1:
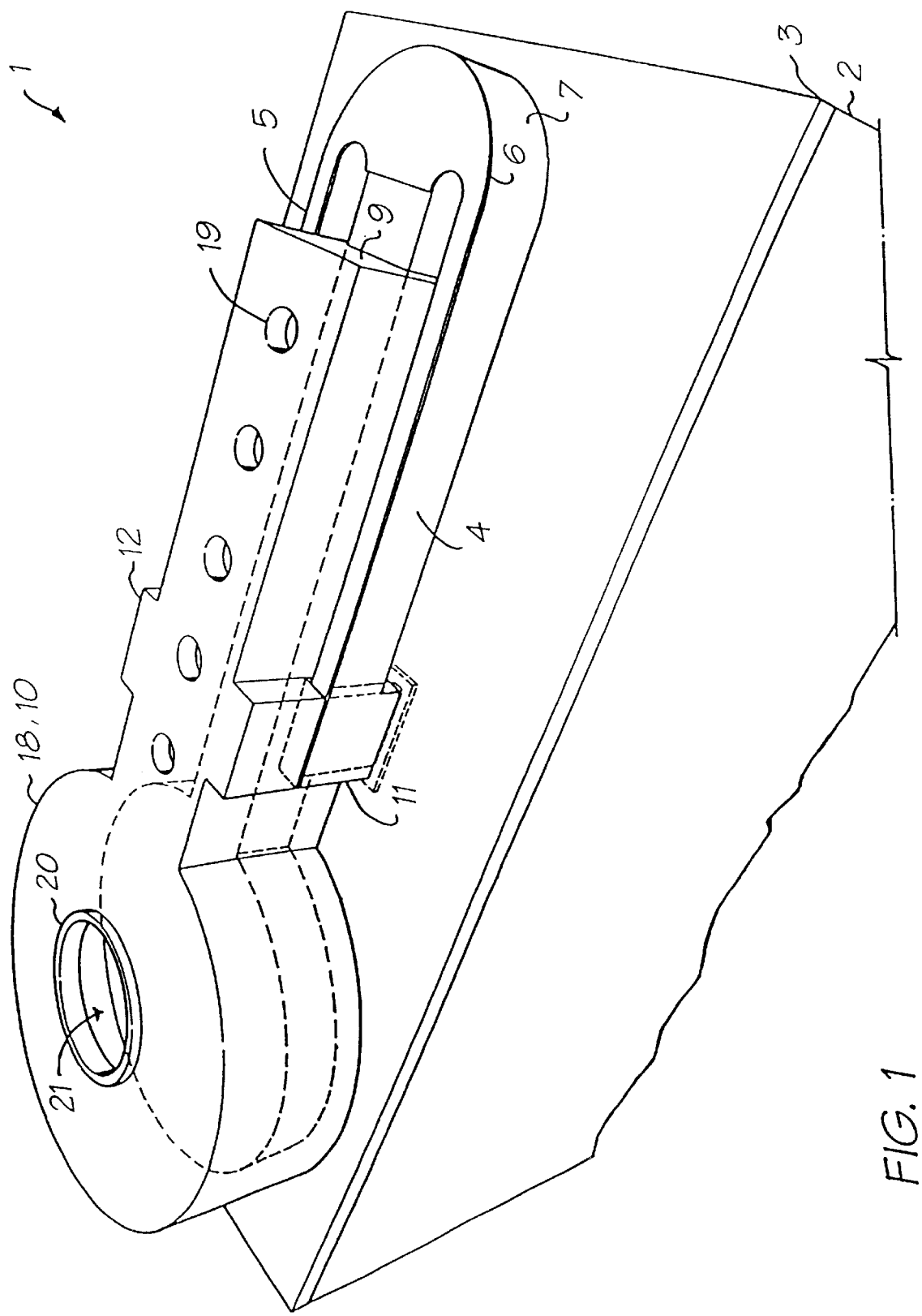
FIG. 1 illustrates a nozzle arrangement in accordance with the invention.

In the preferred embodiment, the actuation of an actuator for the ejection of ink is based around the utilization of material having a High Young's modulus.

In the preferred embodiment, materials are utilized for the ejection of ink which have a high bend efficiency when thermally heated. The inkjet printhead is constructed utilizing standard MEMS technology and therefore should utilize materials that are common in the construction of semiconductor wafers. In the preferred embodiment, the materials have been chosen by using a bend efficiency for actuator devices which can be calculated in accordance with the following formula.

$$\text{Bend Efficiency} = \frac{\text{Coefficient of Thermal Expansion} \times \text{Young's Modulus}}{\text{Heat Capacity} \times \text{Density}}$$

Of course, different equations could be utilized and, in particular, the factors on the numerator and the denominator have been chosen for their following qualities.

Coefficient of thermal expansion: The greater the coefficient of thermal expansion, the greater will be the degree of movement for any particular heating of a thermal actuator.

Young's Modulus: The Young's modulus provides a measure of the tensile or compressive stress of a material and is an indicator of the "strength" of the bending movement. Hence, a material having a high Young's modulus or strength is desirable.

Heat capacity: In respect of the heat capacity, the higher the heat capacity, the greater the ability of material to absorb heat without deformation. This is an undesirable property in a thermal actuator.

Density: The denser the material the greater the heat energy required to heat the material and again, this is an undesirable property.

Example materials and their corresponding "Bend Efficiencies" are listed in the following table:

| MATERIAL | CTE *10⁻⁶/K | Young's modulus GPa | Heat capacity W/Kg/C | Density Kg/M³ | "Bend efficiency" |
|---|---|---|---|---|---|
| Gold | 14.2 | 80 | 129 | 19300 | 456 |
| PTFE | 770 | 1.3 | 1024 | 2130 | 459 |
| Silicon Nitride | 3.3 | 337 | 712 | 3200 | 488 |
| Osmium | 2.6 | 581 | 130 | 22570 | 515 |
| Tantalum-Tungsten alloy | 6.48 | 186 | 140 | 16660 | 517 |
| Silver | 18.9 | 71 | 235 | 10500 | 544 |
| Platinum | 8.8 | 177 | 133 | 21500 | 545 |
| Copper | 16.5 | 124 | 385 | 8960 | 593 |
| Molybdenum | 4.8 | 323 | 251 | 10200 | 606 |
| Aluminium | 23.1 | 28.9 | 897 | 2700 | 657 |
| Nickel | 13.4 | 206 | 444 | 8900 | 699 |
| Tungsten | 4.5 | 408 | 132 | 19300 | 721 |
| Ruthenium | 5.05 | 394 | 247 | 12410 | 1067 |
| Stainless Steel | 20.2 | 215 | 500 | 7850 | 1106 |
| Iridium | 6.8 | 549 | 130 | 22650 | 1268 |
| High Silicon Brass | 31.5 | 130 | 376 | 8250 | 1320 |
| "Chromel D" alloy | 25.2 | 212 | 448 | 7940 | 1502 |
| Titanium DiBoride | 8.2 | 575 | 636 | 4450 | 1666 |
| Boron Carbide | 10.1 | 454 | 955 | 2520 | 1905 |

Utilizing the above equation, it can be seen that a suitable material is titanium diboride ($TiB_2$) which has a high bend efficiency and is also regularly used in semiconductor fabrication techniques. Although this material has a High Young's modulus, the coefficient of thermal expansion is somewhat lower than other possible materials. Hence, in the preferred embodiment, a fulcrum arrangement is utilized to substantially increase the travel of a material upon heating thereby more fully utilizing the effect of the High Young's modulus material.

Figure 2:
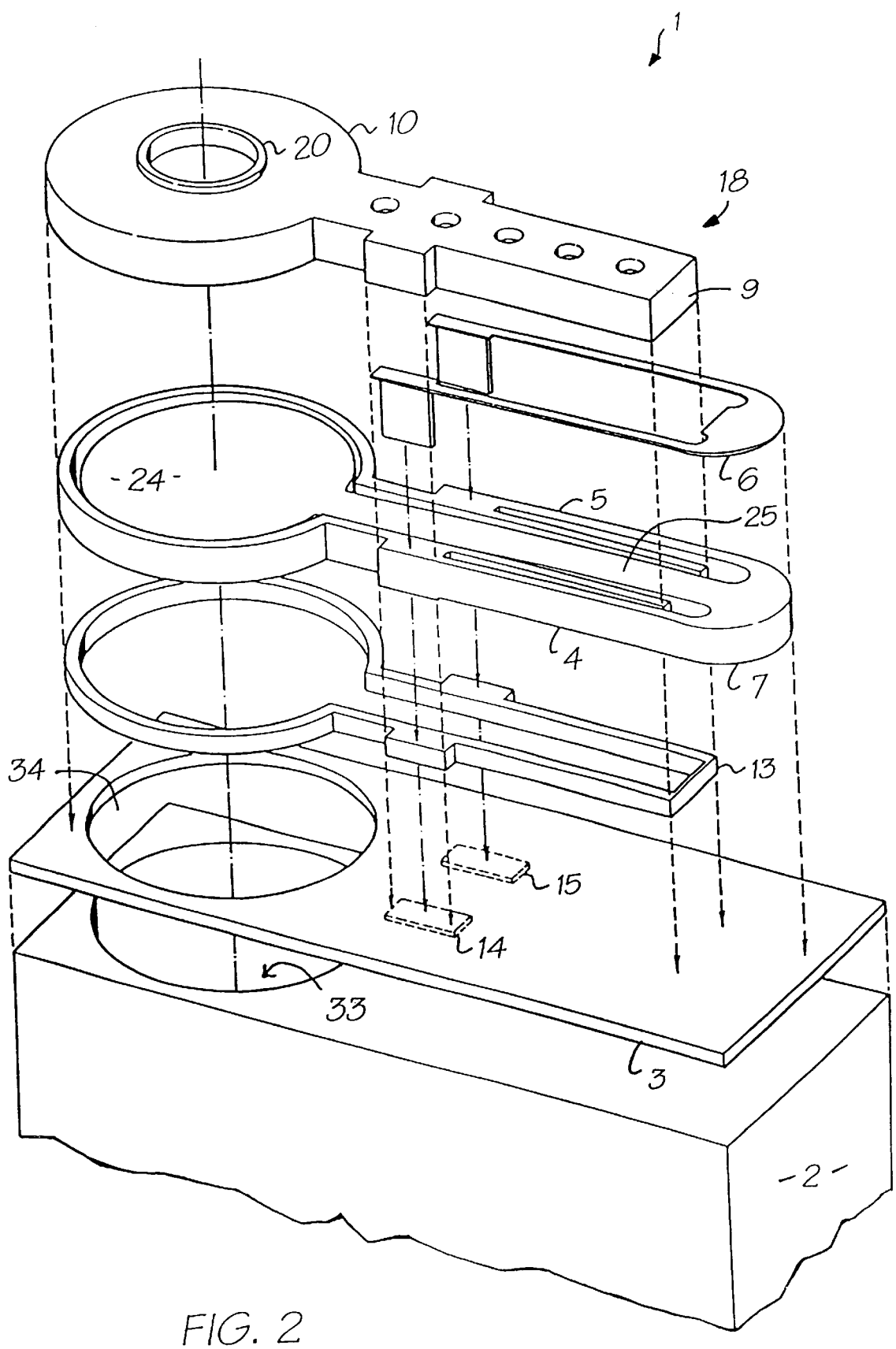
FIG. 2 is an exploded perspective view of the nozzle arrangement of FIG. 1.

Turning initially to FIGS. 1 and 2, there is illustrated a single nozzle arrangement 1 of an inkjet printhead constructed in accordance with the preferred embodiment. FIG. 1 illustrates a side perspective view of the nozzle arrangement and FIG. 2 is an exploded perspective view of the nozzle arrangement of FIG. 1. The single nozzle arrangement 1 can be constructed as part of an array of nozzle arrangements formed on a silicon wafer 2 utilizing standard MEM processing techniques. On top of the silicon wafer 2 is formed a CMOS layer 3 which can include multiple metal layers formed within glass layers in accordance with the normal CMOS methodologies.

The wafer 2 can contain a number of etched chambers eg. 33 the chambers being etched through the wafer utilizing a deep trench silicon etcher.

A suitable plasma etching process can include a deep anisotropic trench etching system such as that available from SDS Systems Limited (See "Advanced Silicon Etching Using High Density Plasmas" by J. K. Bhardwaj, H. Ashraf, page 224 of Volume 2639 of the SPIE Proceedings in Micro Machining and Micro Fabrication Process Technology).

The preferred embodiment 1 includes two arms 4,5 which operate in air and are constructed from a thin 0.3 micrometer layer of titanium diboride 6 on top of a much thicker 5.8 micron layer of glass 7. The two arms 4,5 are joined together and pivot around a point 9 which is a thin membrane forming an enclosure which in turn forms part of the nozzle chamber 10.

The arms 4 and 5 are affixed by posts 11,12 to lower aluminium conductive layers 14,15 which can form part of the CMOS layer 3. The outer surfaces of the nozzle chamber 18 can be formed from glass or nitride and provide an enclosure to be filled with ink. The outer chamber 18 includes a number of etchant holes e.g. 19 which are provided for the rapid sacrificial etchant of internal cavities during construction. A nozzle rim 20 is further provided around an ink ejection port 21 for the ejection of ink.

The paddle surface 24 is bent downwards as a result of release of the structure during fabrication. A current is passed through the titanium boride layer 6 to cause heating of this layer along arms 4 and 5. The heating generally expands the $T_1B_2$ layer of arms 4 and 5 which have a high young's modulus. This expansion acts to bend the arms generally downwards, which are in turn pivoted around the membrane 9. The pivoting results in a rapid upward movement of the paddle surface 24. The upward movement of the paddle surface 24 causes the ejection of ink from the nozzle chamber 21. The increase in pressure is insufficient to overcome the surface tension characteristics of the smaller etchant holes 19 with the result being that ink is ejected from the nozzle chamber hole 21.

Figure 3:
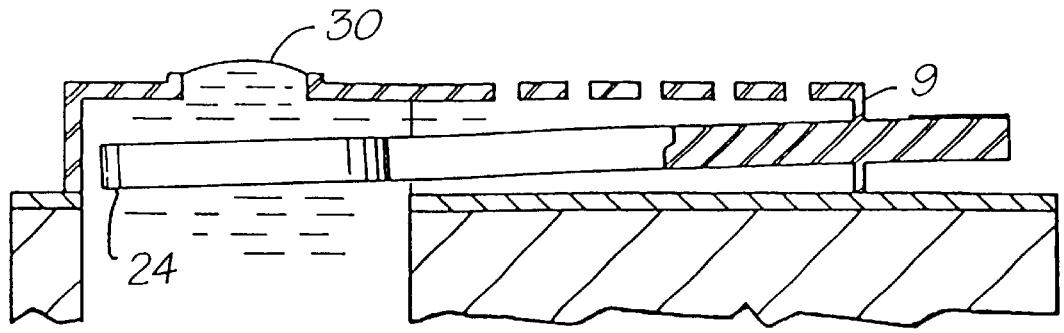
FIGS. 3 to 5 illustrate the operation of the nozzle arrangement.
Figure 4:
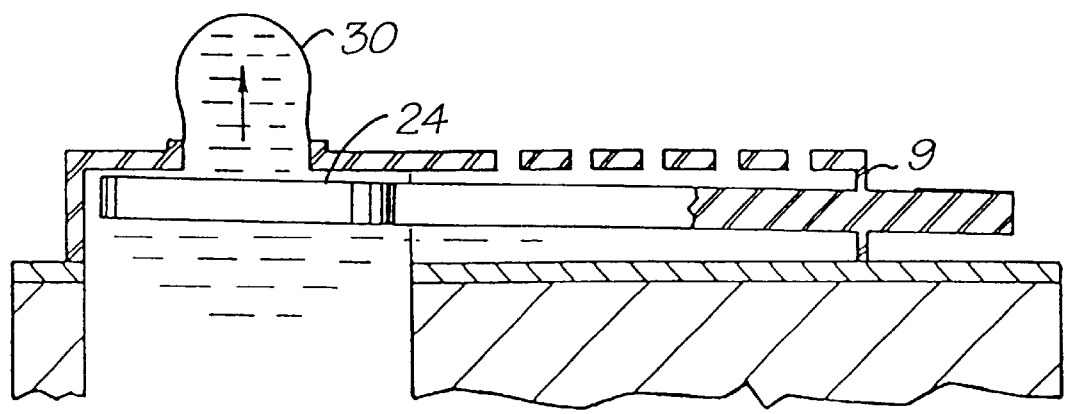
Figure 5:
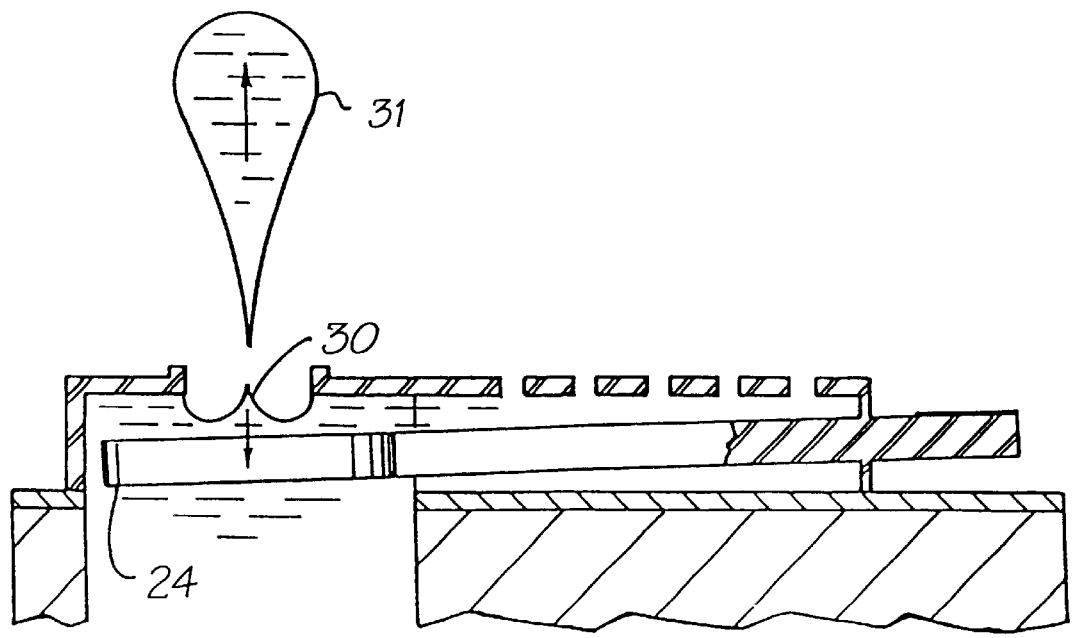

As noted previously the thin titanium diboride strip 6 has a sufficiently high young's modulus so as to cause the glass layer 7 to be bent upon heating of the titanium diboride layer 6. Hence, the operation of the inkjet device can be as illustrated in FIGS. 3–5. In its quiescent state, the inkjet nozzle is as illustrated in FIG. 3, generally in the bent down position with the ink meniscus 30 forming a slight bulge and the paddle being pivoted around the membrane wall 9. The heating of the titanium diboride layer 6 causes it to expand. Subsequently, it is bent by the glass layer 7 so as to cause the pivoting of the paddle 24 around the membrane wall 9 as indicated in FIG. 4. This causes the rapid expansion of the meniscus 30 resulting in the general ejection of ink from the nozzle chamber 10. Next, the current to the titanium diboride layer is turned off and the paddle 24 returns to its quiescent state resulting in a general sucking back of ink via the meniscus 30 which in turn results in the ejection of a drop 31 on demand from the nozzle chamber 10.

Although many different alternatives are possible, the arrangement of the preferred embodiment can be constructed utilizing the following processing steps:

1. The starting wafer is a CMOS processed wafer with suitable electrical circuitry for the operation of an array of printhead nozzles and includes aluminium layer portions 14,15.

2. First, the CMOS wafer layer 3 can be etched down to the silicon wafer layer 2 in the area of an ink supply channel 34.

3. Next, a sacrificial layer can be constructed on top of the CMOS layer and planarized. A suitable sacrificial material can be aluminium. This layer is planarized, masked and etched to form cavities for the glass layer 7. Subsequently, a glass layer is deposited on top of the sacrificial aluminium layer and etched so as to form the glass layer 7 and a layer 13.

4. A titanium diboride layer 6 is then deposited followed by the deposition of a second sacrificial material layer, the material again can be aluminium, the layer subsequently being planarized.

5. The sacrificial etchant layer is then etched to form cavities for the deposition of the side walls eg. 9 of the top of the nozzle chamber 10.

6. A glass layer 52 is then deposited on top of the sacrificial layer and etched so as to form a roof of the chamber layer.

7. The rim 20 ink ejection port 21 and etchant holes e.g. 19 can then be formed in the glass layer 52 utilizing suitable etching processes.

8. The sacrificial aluminium layers are sacrificially etched away so as to release the MEMS structure.

9. The ink supply channels can be formed through the back etching of the silicon wafer utilizing a deep anisotropic trench etching system such as that available from Silicon Technology Systems. The deep trench etching systems can also be simultaneously utilized to separate printheads of a wafer which can then be mounted on an ink supply system and tested for operational capabilities.

Figure 6:
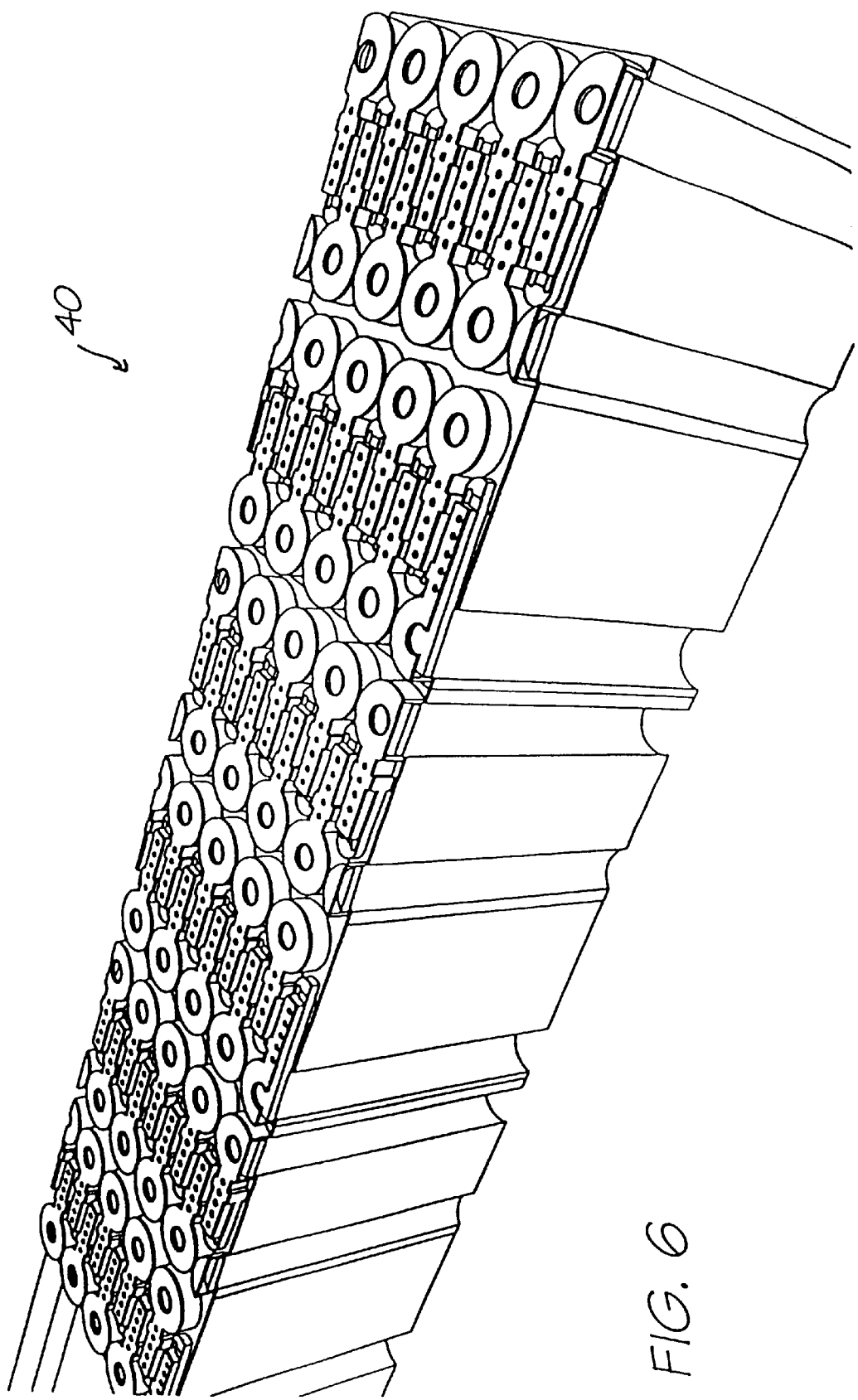
FIG. 6 illustrates an array of nozzle arrangements for use with an inkjet printhead.
Figure 7:
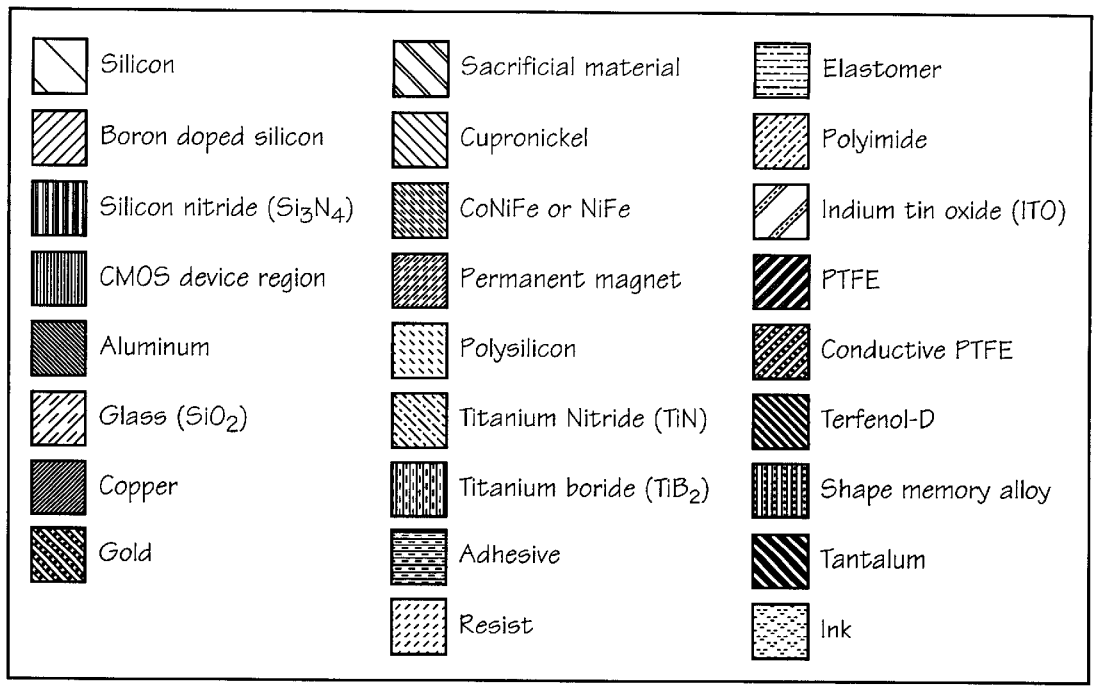
FIG. 7 provides a legend of the materials indicated in FIGS. 8 to 19.
Figure 8:
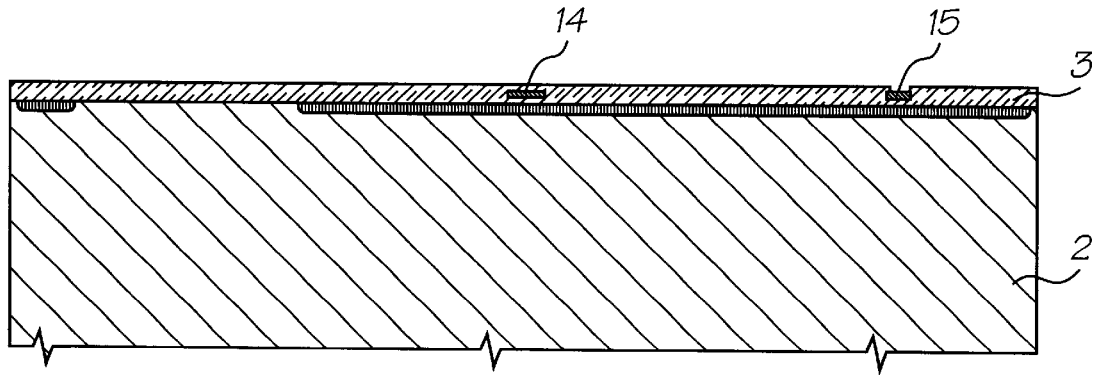
FIG. 8 to FIG. 19 illustrate sectional views of the manufacturing steps in one form of construction of an ink jet printhead nozzle.

Turning finally to FIG. 6, there is illustrated a portion of a printhead 40 showing a multi-colored series of inkjet nozzles suitably arranged to form a multi-colored printhead. The portion is shown, partially in section so as to illustrate the through wafer etching process One form of detailed manufacturing process which can be used to fabricate monolithic ink jet printheads operating in accordance with the principles taught by the present embodiment can proceed utilizing the following steps:

1. Using a double sided polished wafer 2, complete drive transistors, data distribution, and timing circuits using a 0.5 micron, one poly, 2 metal CMOS process 3. Relevant features of the wafer at this step are shown in FIG. 8. For clarity, these diagrams may not be to scale, and may not represent a cross section though any single plane of the nozzle. FIG. 7 is a key to representations of various materials in these manufacturing diagrams, and those of other cross referenced ink jet configurations.

Figure 9:
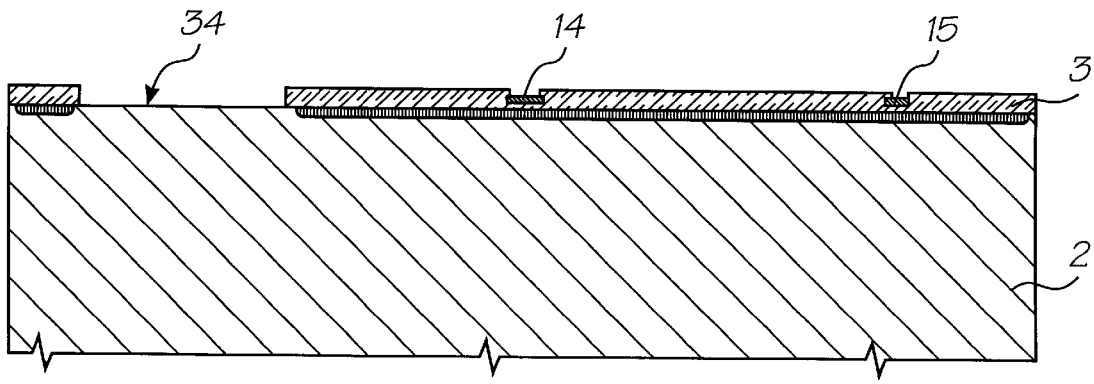

2. Etch oxide down to silicon or aluminum using Mask 1. This mask defines the ink inlet, channel 34, a heater contact vias, and the edges of the printhead chips. This step is shown in FIG. 9.

3. Deposit 1 micron of sacrificial material 50 (e.g. aluminum)

Figure 10:
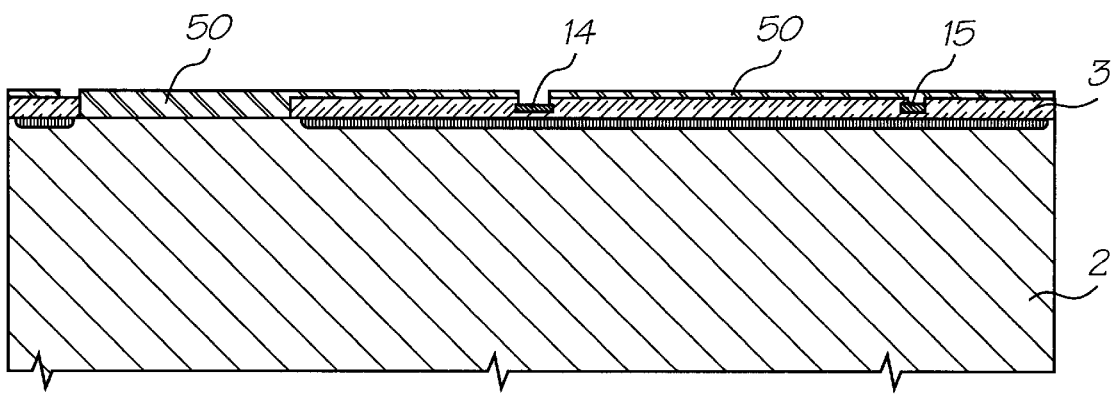

4. Etch the sacrificial layer using Mask 2, defining the nozzle chamber wall and the actuator anchor point. This step is shown in FIG. 10.

5. Deposit 3 microns of PECVD glass 13, and etch the glass 13 using Mask 3. This mask defines the actuator, the nozzle walls, and the actuator anchor points with the exception of the contact vias. The etch continues through to aluminum.

Figure 11:
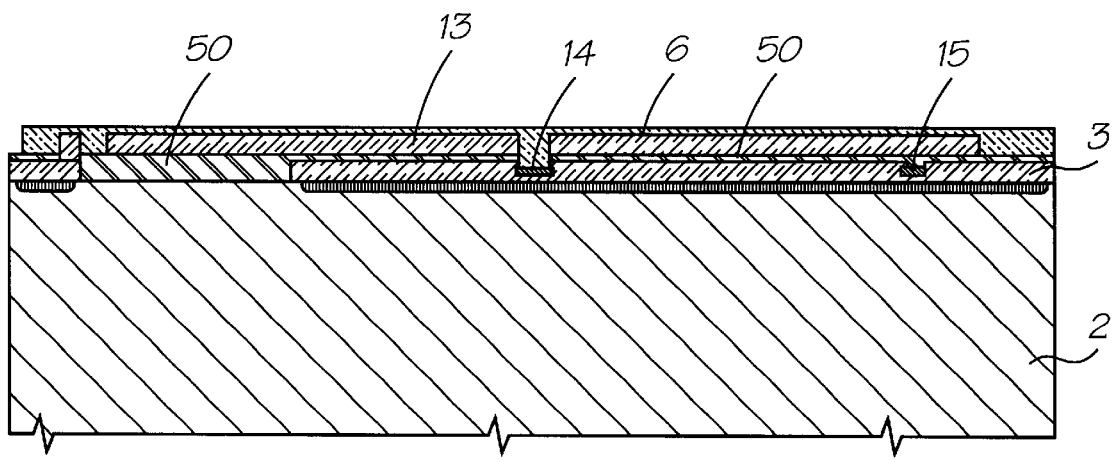

6. Deposit 0.5 microns of heater material 6, for example titanium nitride (TiN) or titanium diboride (TiB$_2$). This step is shown in FIG. 11.

Figure 12:
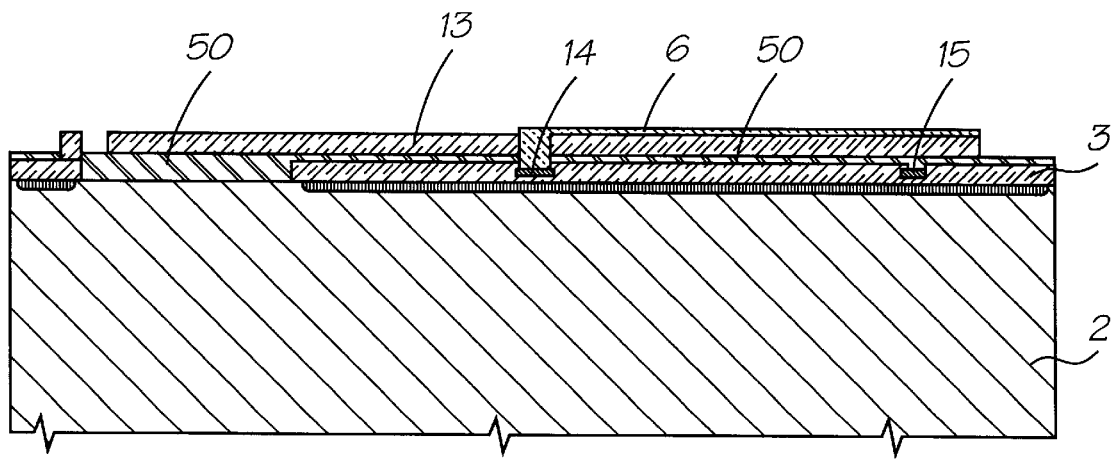

7. Etch the heater material using Mask 4, which defines the actuator loop. This step is shown in FIG. 12.

8. Wafer probe. All electrical connections are complete at this point, bond pads are accessible, and the chips are not yet separated.

9. Deposit 8 microns of sacrificial material 51.

Figure 13:
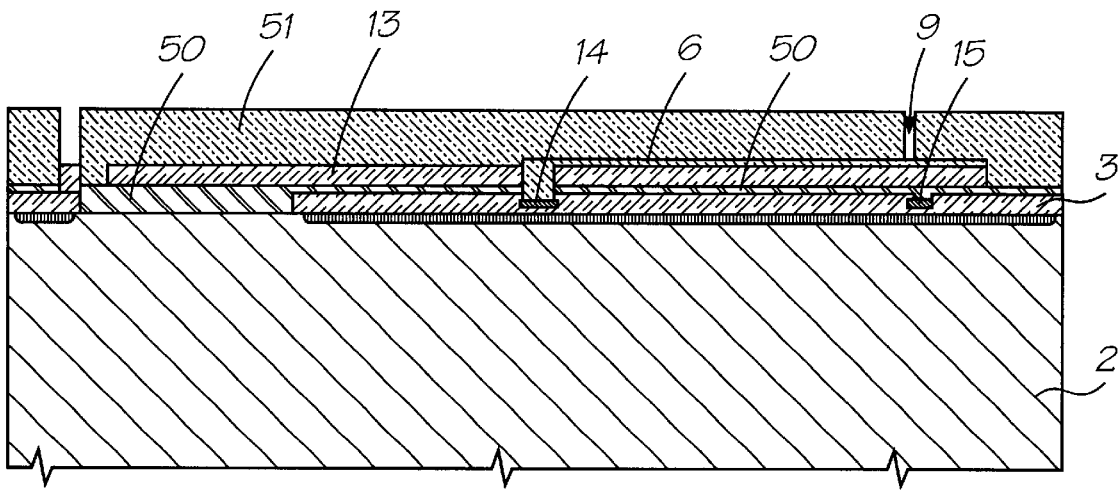

10. Etch the sacrificial material down to glass or heater material using Mask 5. This mask defines the nozzle chamber wall the side wall e.g. 9, and actuator anchor points. This step is shown in FIG. 13.

Figure 14:
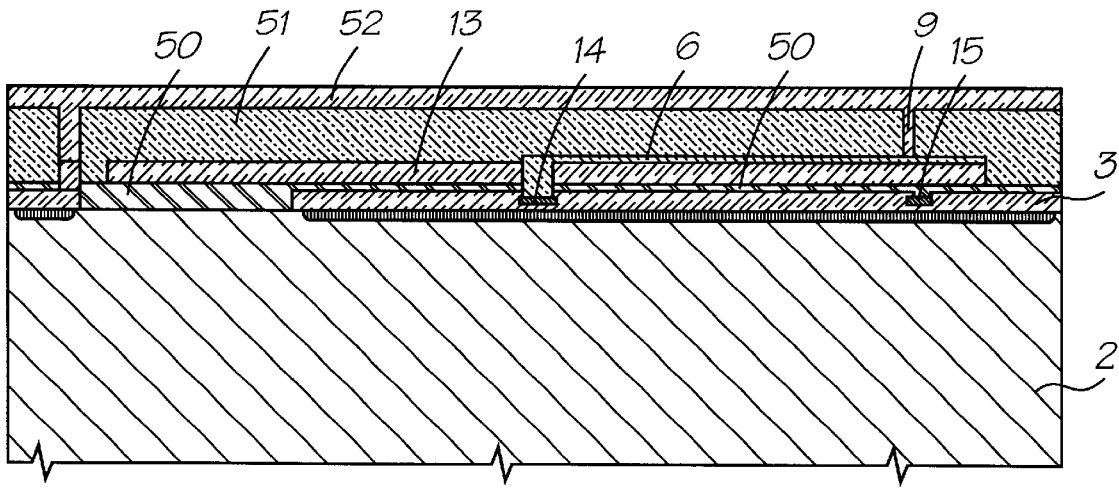
Figure 15:
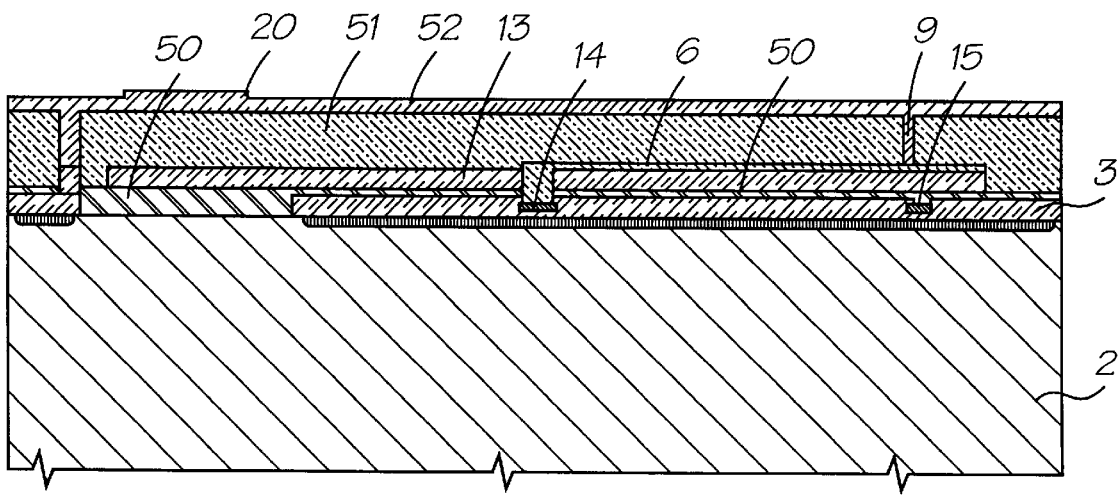

11. Deposit 3 microns of PECVD glass 52. This step is shown in FIG. 14. 12. Etch the glass 52 to a depth of 1 micron using Mask 6. This mask defines the nozzle rim 20. This step is shown in FIG. 15.

Figure 16:
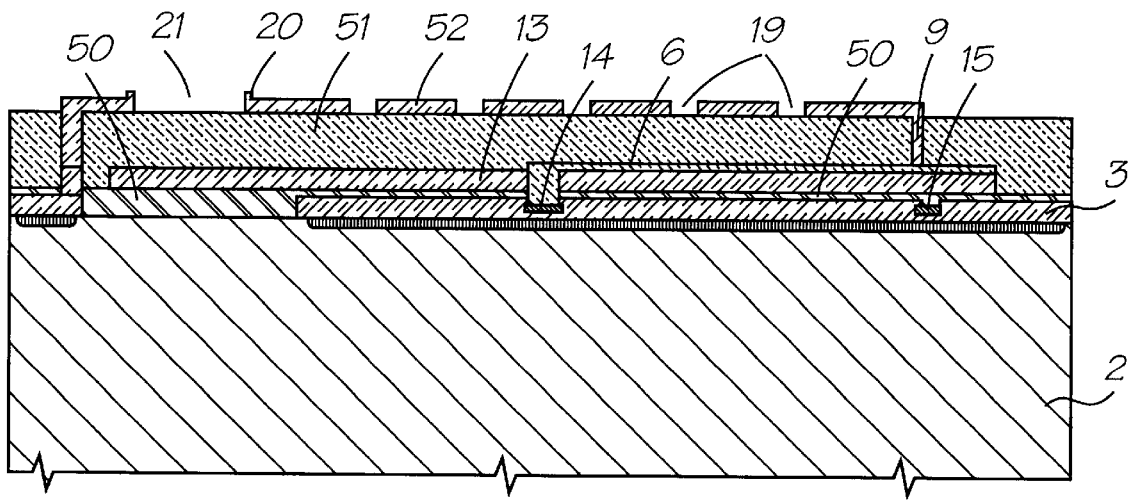

13. Etch down to the sacrificial layer using Mask 7. This mask defines the nozzle port 21 and the sacrificial etch access holes 19. This step is shown in FIG. 16.

Figure 17:
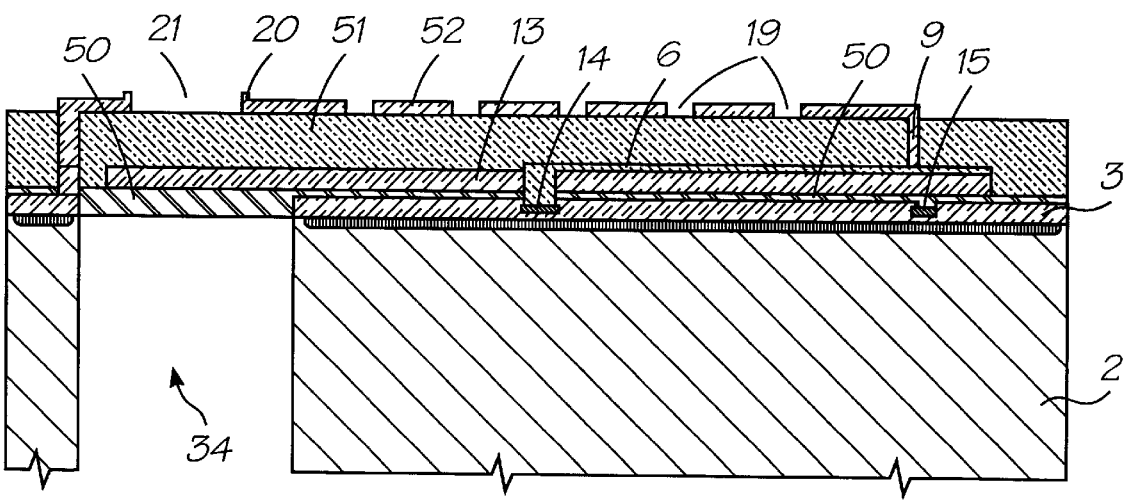

14. Back-etch completely through the silicon wafer (with, for example, an ASE Advanced Silicon Etcher from Surface Technology Systems) using Mask 8. This mask defines the ink inlet channels 34 which are etched through the wafer. The wafer is also diced by this etch. This step is shown in FIG. 17.

Figure 18:
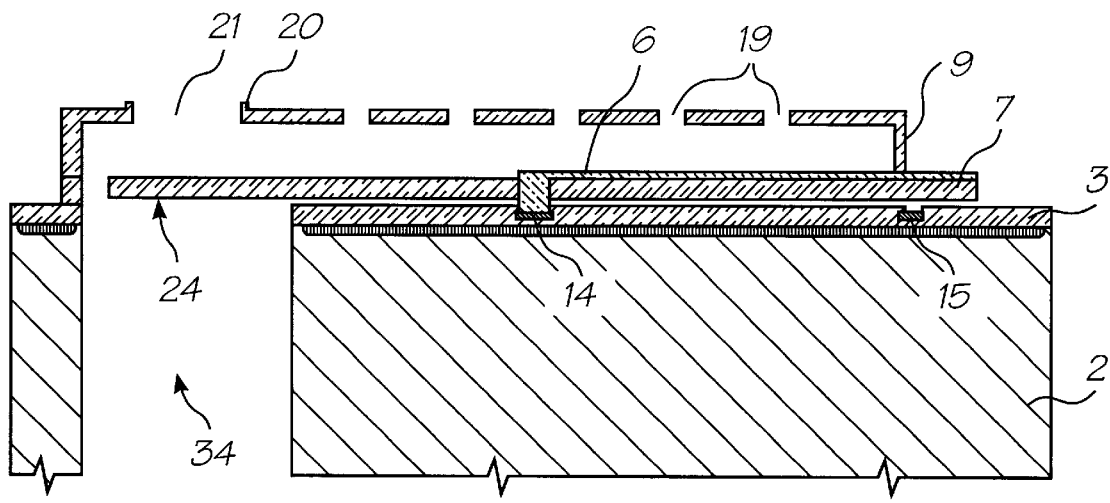

15. Etch the sacrificial material. The nozzle chambers 10 are cleared, the actuators freed, and the chips are separated by this etch. This step is shown in FIG. 18.

16. Mount the printheads in their packaging, which may be a molded plastic former incorporating ink channels which supply the appropriate color ink to the ink inlets at the back of the wafer.

17. Connect the printheads to their interconnect systems. For a low profile connection with minimum disruption of airflow, TAB may be used. Wire bonding may also be used if the printer is to be operated with sufficient clearance to the paper.

18. Hydrophobize the front surface of the printheads.

Figure 19:
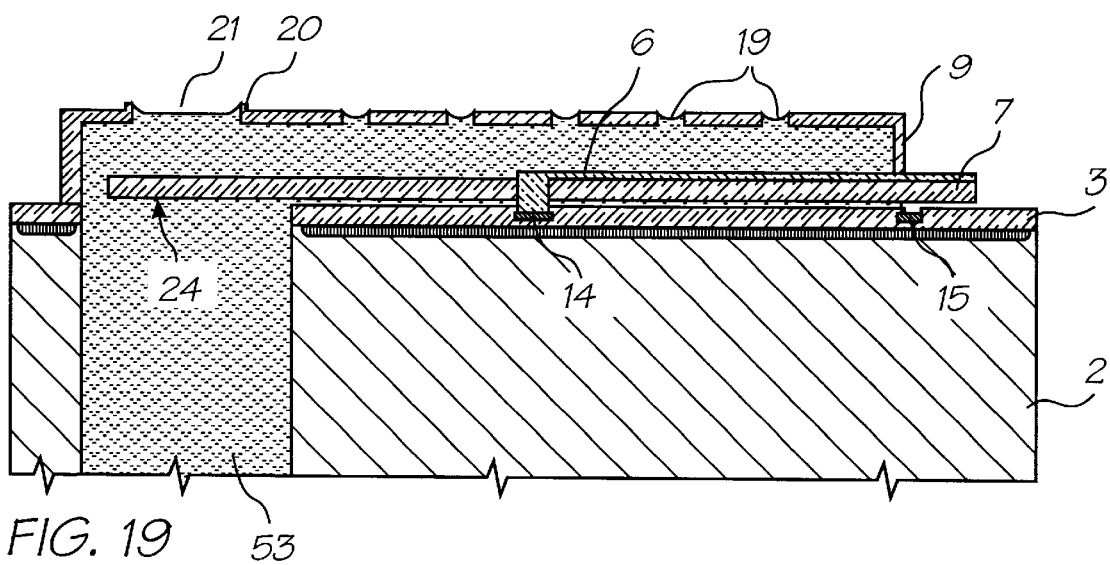

19. Fill the completed printheads with ink 53 and test them. A filled nozzle is shown in FIG. 19.

Figure 20:
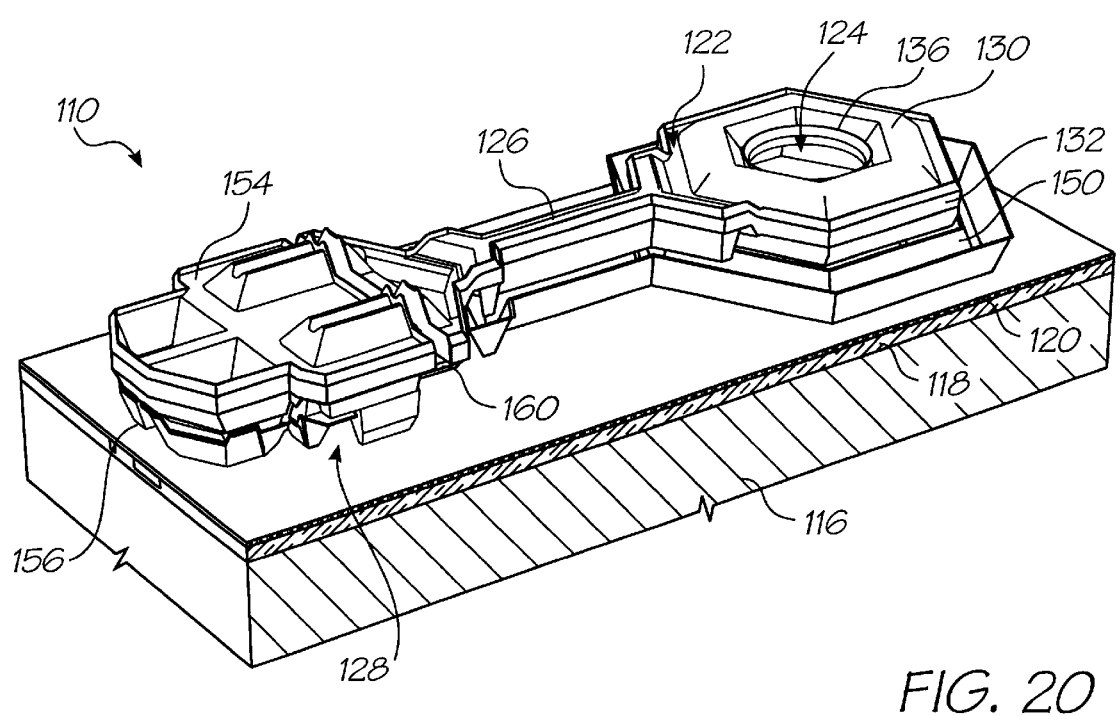
FIG. 20 shows a three dimensional, schematic view of a nozzle assembly for an ink jet printhead in accordance with the invention.

Referring now to FIG. 20 of the drawings, a nozzle assembly, in accordance with a further embodiment of the invention is designated generally by the reference numeral 110. An ink jet printhead has a plurality of nozzle assemblies 110 arranged in an array 114 (FIGS. 25 and 26) on a silicon substrate 116. The array 114 will be described in greater detail below.

The assembly 110 includes a silicon substrate or wafer 116 on which a dielectric layer 118 is deposited. A CMOS passivation layer 120 is deposited on the dielectric layer 118.

Each nozzle assembly 110 includes a nozzle 122 defining a nozzle opening 124, a connecting member in the form of a lever arm 126 and an actuator 128. The lever arm 126 connects the actuator 128 to the nozzle 122.

Figure 21:
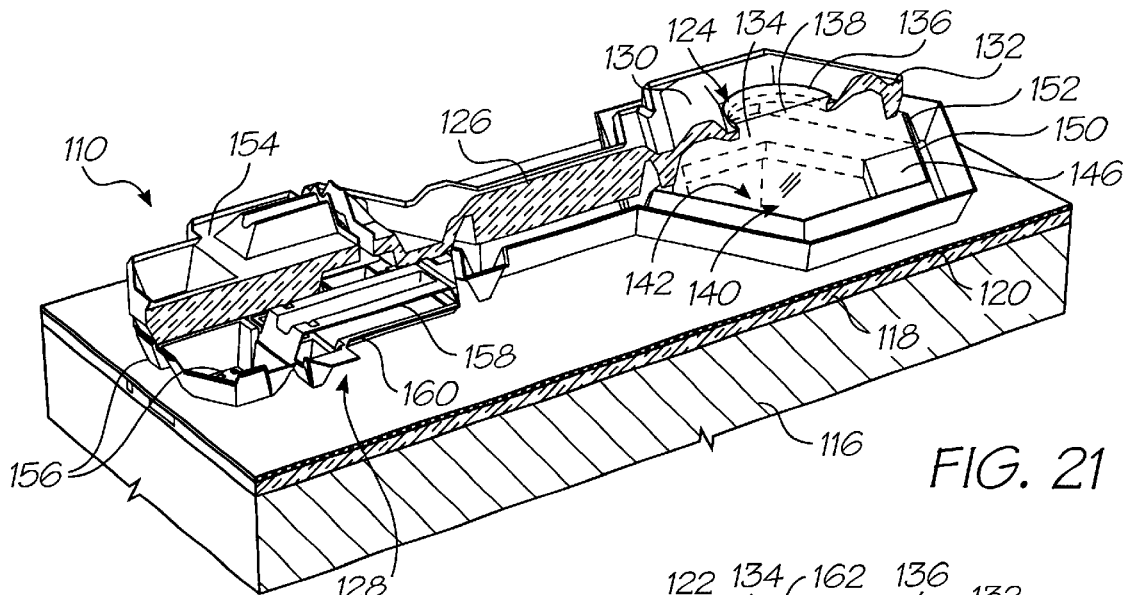
FIGS. 21 to 23 show a three dimensional, schematic illustration of an operation of the nozzle assembly of FIG. 20.
Figure 22:
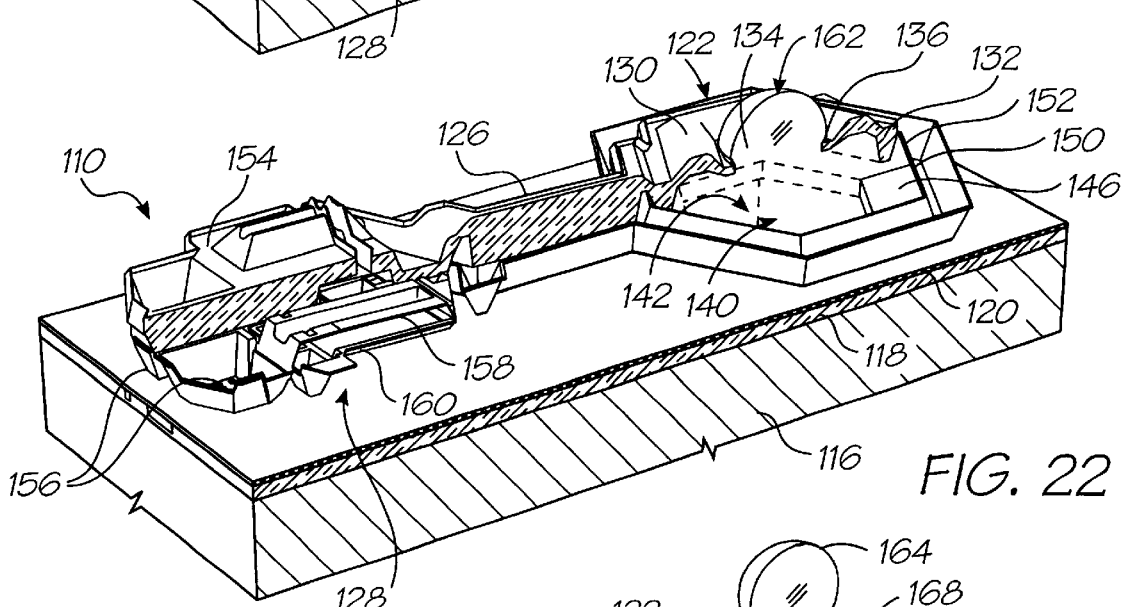
Figure 23:
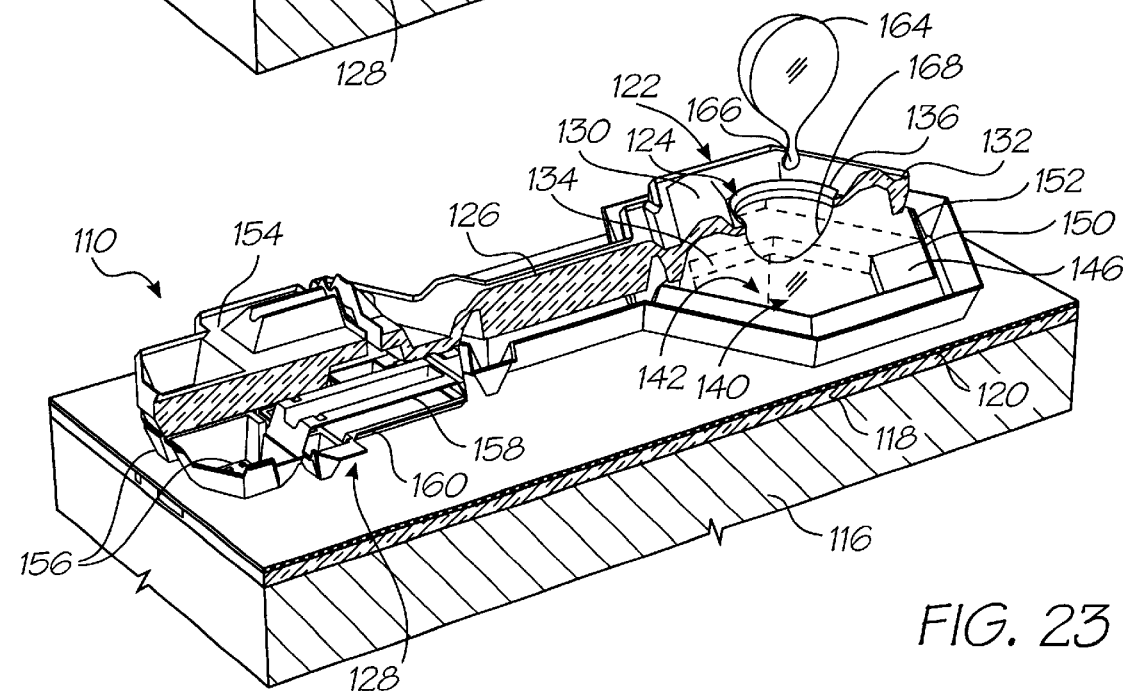

As shown in greater detail in FIGS. 21 to 23 of the drawings, the nozzle 122 comprises a crown portion 130 with a skirt portion 132 depending from the crown portion 130. The skirt portion 132 forms part of a peripheral wall of a nozzle chamber 134 (FIGS. 21 to 23 of the drawings). The nozzle opening 124 is in fluid communication with the nozzle chamber 134. It is to be noted that the nozzle opening 124 is surrounded by a raised rim 136 which "pins" a meniscus 138 (FIG. 21) of a body of ink 140 in the nozzle chamber 134.

An ink inlet aperture 142 (shown most clearly in FIG. 25) is defined in a floor 146 of the nozzle chamber 134. The aperture 142 is in fluid communication with an ink inlet channel 148 defined through the substrate 116.

A wall portion 150 bounds the aperture 142 and extends upwardly from the floor portion 146. The skirt portion 132, as indicated above, of the nozzle 122 defines a first part of a peripheral wall of the nozzle chamber 134 and the wall portion 150 defines a second part of the peripheral wall of the nozzle chamber 134.

The wall 150 has an inwardly directed lip 152 at its free end which serves as a fluidic seal which inhibits the escape of ink when the nozzle 122 is displaced, as will be described in greater detail below. It will be appreciated that, due to the viscosity of the ink 140 and the small dimensions of the spacing between the lip 152 and the skirt portion 132, the inwardly directed lip 152 and surface tension function as a seal for inhibiting the escape of ink from the nozzle chamber 134.

The actuator 128 is a thermal bend actuator and is connected to an anchor 154 extending upwardly from the substrate 116 or, more particularly, from the CMOS passivation layer 120. The anchor 154 is mounted on conductive pads 156 which form an electrical connection with the actuator 128.

The actuator 128 comprises a first, active beam 158 arranged above a second, passive beam 160. In a preferred embodiment, both beams 158 and 160 are of, or include, a conductive ceramic material such as titanium nitride (TiN).

Both beams 158 and 160 have their first ends anchored to the anchor 154 and their opposed ends connected to the arm 126. When a current is caused to flow through the active beam 158 thermal expansion of the beam 158 results. As the passive beam 160, through which there is no current flow, does not expand at the same rate, a bending moment is created causing the arm 126 and, hence, the nozzle 122 to be displaced downwardly towards the substrate 116 as shown in FIG. 22 of the drawings. This causes an ejection of ink through the nozzle opening 124 as shown at 162 in FIG. 22 of the drawings. When the source of heat is removed from the active beam 158, i.e. by stopping current flow, the nozzle 122 returns to its quiescent position as shown in FIG. 23 of the drawings. When the nozzle 122 returns to its quiescent position, an ink droplet 164 is formed as a result of the breaking of an ink droplet neck as illustrated at 166 in FIG. 23 of the drawings. The ink droplet 164 then travels on to the print media such as a sheet of paper. As a result of the formation of the ink droplet 164, a "negative" meniscus is formed as shown at 168 in FIG. 23 of the drawings. This "negative" meniscus 168 results in an inflow of ink 140 into the nozzle chamber 134 such that a new meniscus 138 (FIG. 21) is formed in readiness for the next ink drop ejection from the nozzle assembly 110.

Figure 24:
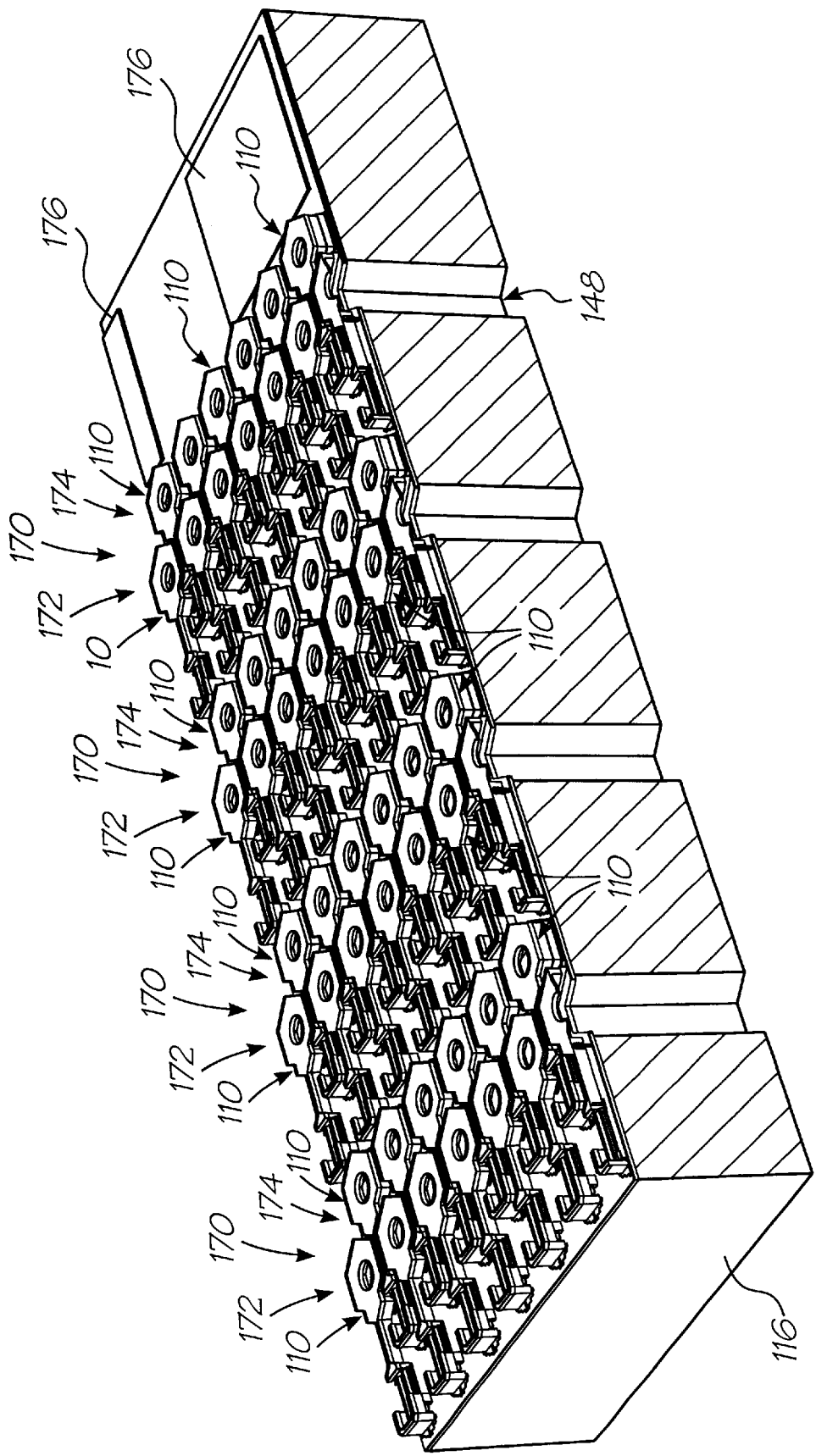
FIG. 24 shows a three dimensional view of a nozzle array constituting an ink jet printhead.
Figure 25:
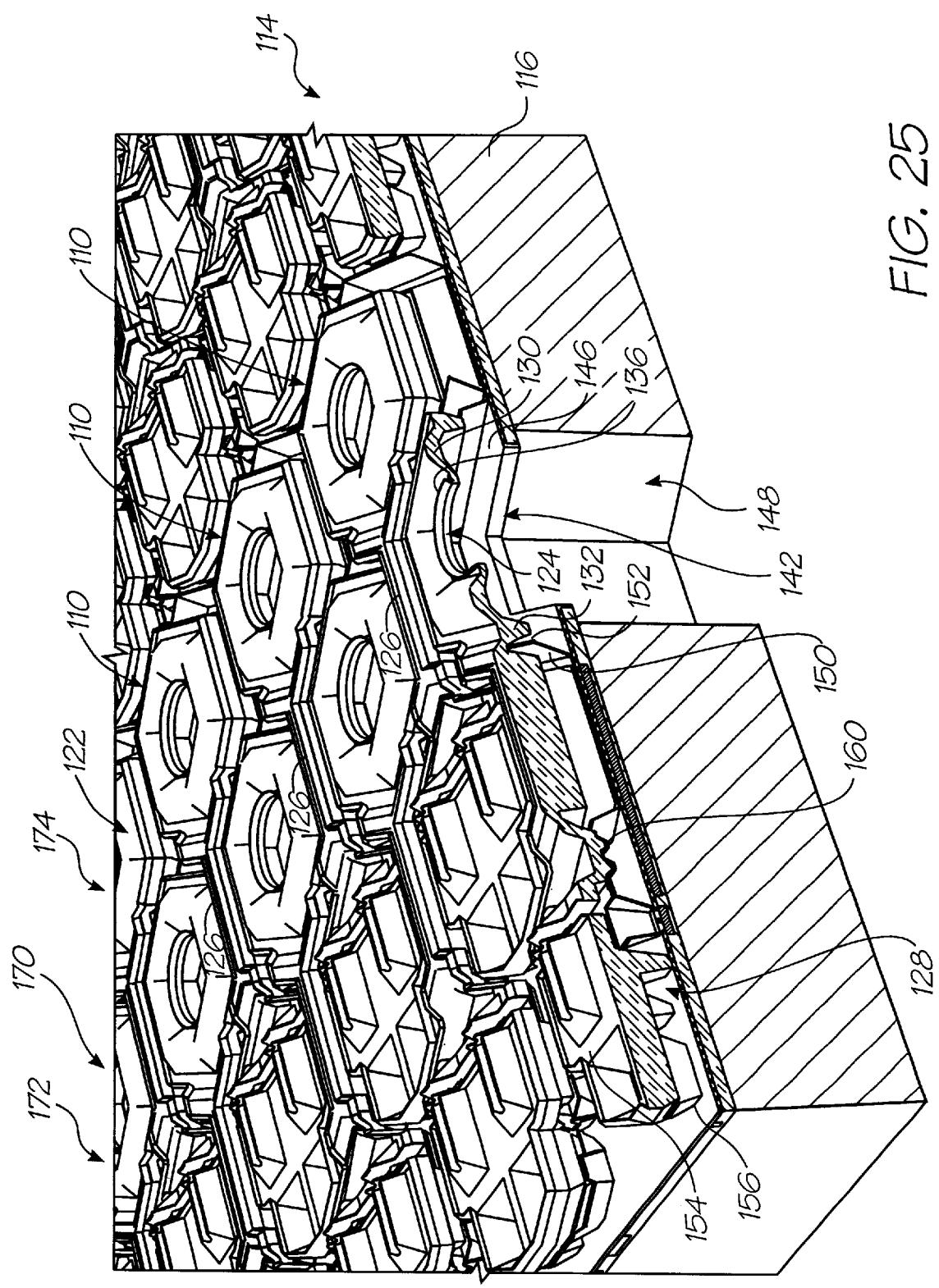
FIG. 25 shows, on an enlarged scale, part of the array of FIG. 24.

Referring now to FIGS. 24 and 25 of the drawings, the nozzle array 114 is described in greater detail. The array 114 is for a four color printhead. Accordingly, the array 114 includes four groups 170 of nozzle assemblies, one for each color. Each group 170 has its nozzle assemblies 110 arranged in two rows 172 and 174. One of the groups 170 is shown in greater detail in FIG. 25 of the drawings.

To facilitate close packing of the nozzle assemblies 110 in the rows 172 and 174, the nozzle assemblies 110 in the row 174 are offset or staggered with respect to the nozzle assemblies 110 in the row 172. Also, the nozzle assemblies 110 in the row 172 are spaced apart sufficiently far from each other to enable the lever arms 126 of the nozzle assemblies 110 in the row 174 to pass between adjacent nozzles 122 of the assemblies 110 in the row 172. It is to be noted that each nozzle assembly 110 is substantially dumbbell shaped so that the nozzles 122 in the row 172 nest between the nozzles 122 and the actuators 128 of adjacent nozzle assemblies 110 in the row 174.

Further, to facilitate close packing of the nozzles 122 in the rows 172 and 174, each nozzle 122 is substantially hexagonally shaped.

It will be appreciated by those skilled in the art that, when the nozzles 122 are displaced towards the substrate 116, in use, due to the nozzle opening 124 being at a slight angle with respect to the nozzle chamber 134 ink is ejected slightly off the perpendicular. It is an advantage of the arrangement shown in FIGS. 24 and 25 of the drawings that the actuators 128 of the nozzle assemblies 110 in the rows 172 and 174 extend in the same direction to one side of the rows 172 and 174. Hence, the ink droplets ejected from the nozzles 122 in the row 172 and the ink droplets ejected from the nozzles 122 in the row 174 are parallel to one another resulting in an improved print quality.

Also, as shown in FIG. 24 of the drawings, the substrate 116 has bond pads 176 arranged thereon which provide the electrical connections, via the pads 156, to the actuators 128 of the nozzle assemblies 110. These electrical connections are formed via the CMOS layer (not shown).

Figure 26:
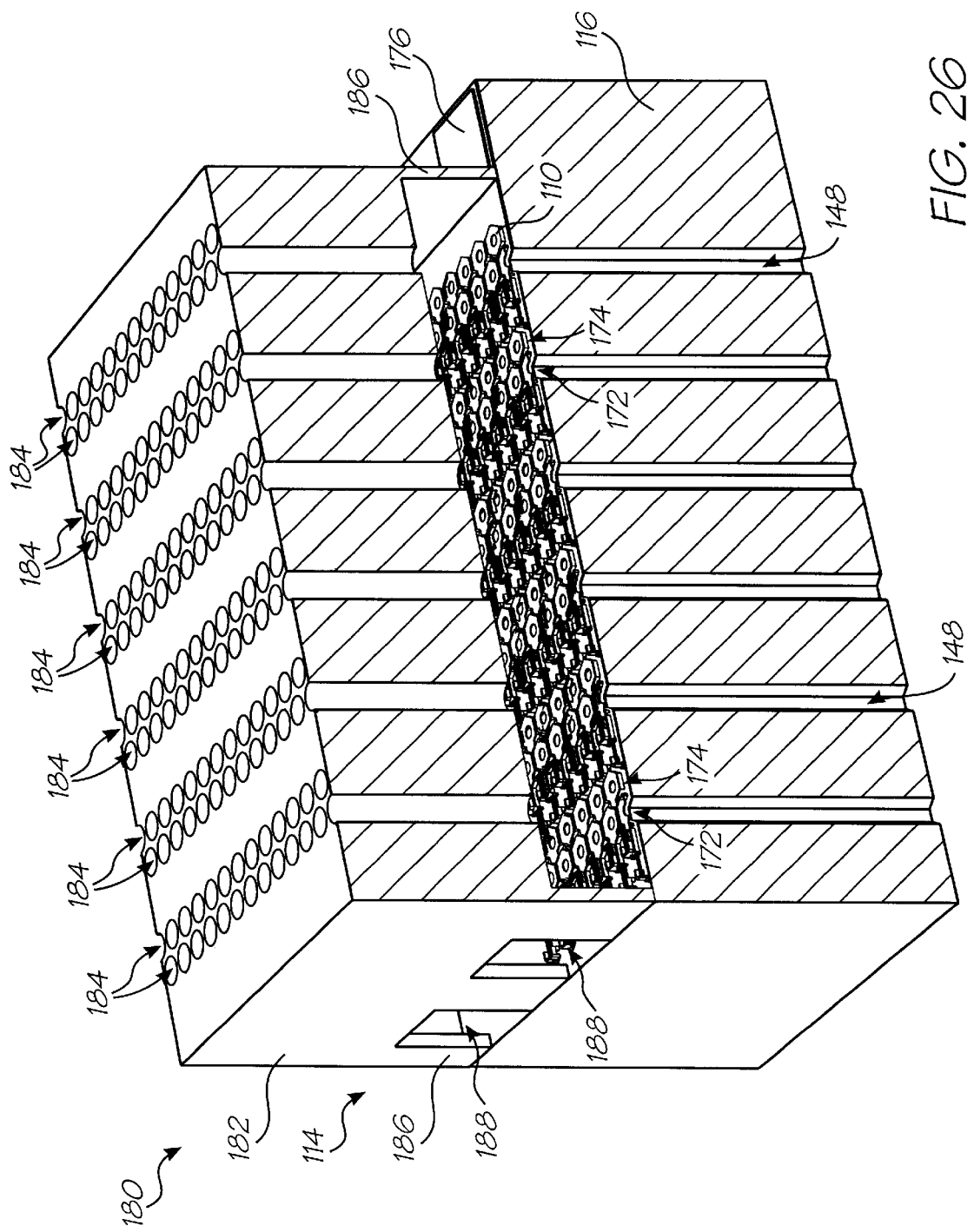
FIG. 26 shows a three dimensional view of an ink jet printhead including a nozzle guard.

Referring to FIG. 26 of the drawings, a development of the invention is shown. With reference to the previous drawings, like reference numerals refer to like parts, unless otherwise specified.

In this development, a nozzle guard 180 is mounted on the substrate 116 of the array 114. The nozzle guard 180 includes a body member 182 having a plurality of passages 184 defined therethrough. The passages 184 are in register with the nozzle openings 124 of the nozzle assemblies 110 of the array 114 such that, when ink is ejected from any one of the nozzle openings 124, the ink passes through the associated passage 184 before striking the print media.

The body member 182 is mounted in spaced relationship relative to the nozzle assemblies 110 by limbs or struts 186. One of the struts 186 has air inlet openings 188 defined therein.

In use, when the array 114 is in operation, air is charged through the inlet openings 188 to be forced through the passages 184 together with ink travelling through the passages 184.

The ink is not entrained in the air as the air is charged through the passages 184 at a different velocity from that of the ink droplets 164. For example, the ink droplets 164 are ejected from the nozzles 122 at a velocity of approximately 3 m/s. The air is charged through the passages 184 at a velocity of approximately 1 m/s.

The purpose of the air is to maintain the passages 184 clear of foreign particles. A danger exists that these foreign particles, such as dust particles, could fall onto the nozzle assemblies 110 adversely affecting their operation. With the provision of the air inlet openings 88 in the nozzle guard 180 this problem is, to a large extent, obviated.

Referring now to FIGS. 27 to 29 of the drawings, a process for manufacturing the nozzle assemblies 110 is described.

Starting with the silicon substrate or wafer 116, the dielectric layer 118 is deposited on a surface of the wafer 116. The dielectric layer 118 is in the form of approximately 1.5 microns of CVD oxide. Resist is spun on to the layer 118 and the layer 118 is exposed to mask 200 and is subsequently developed.

After being developed, the layer 118 is plasma etched down to the silicon layer 116. The resist is then stripped and the layer 118 is cleaned. This step defines the ink inlet aperture 142.

Figure 27A:
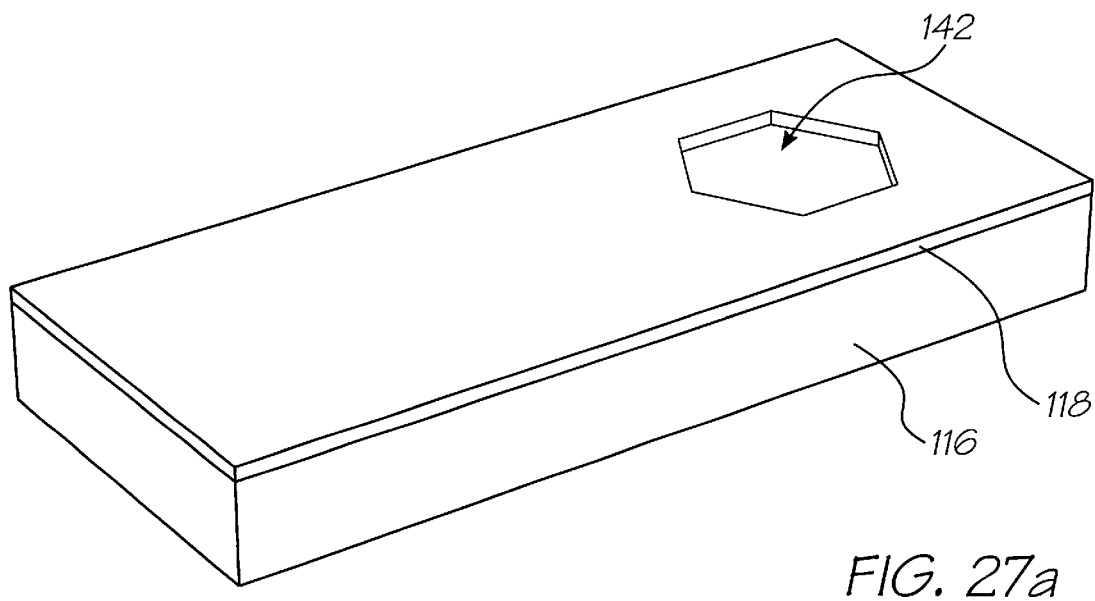
FIGS. 27a to 27r show three-dimensional views of steps in the manufacture of a nozzle assembly of an ink jet printhead.
Figure 28A:
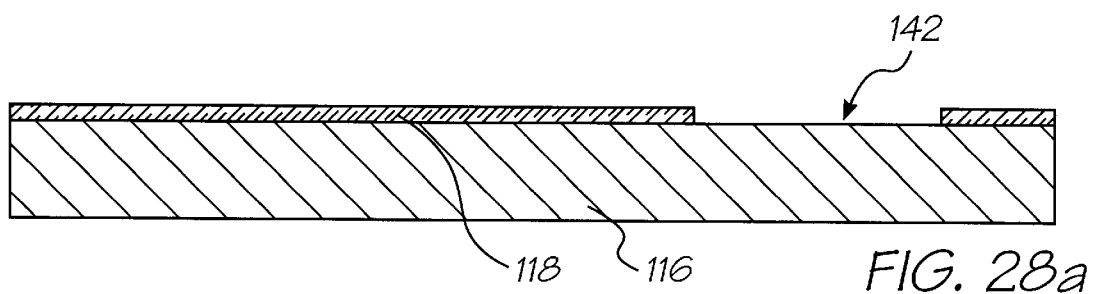
FIGS. 28a to 28r show sectional side views of the manufacturing steps.
Figure 29A:
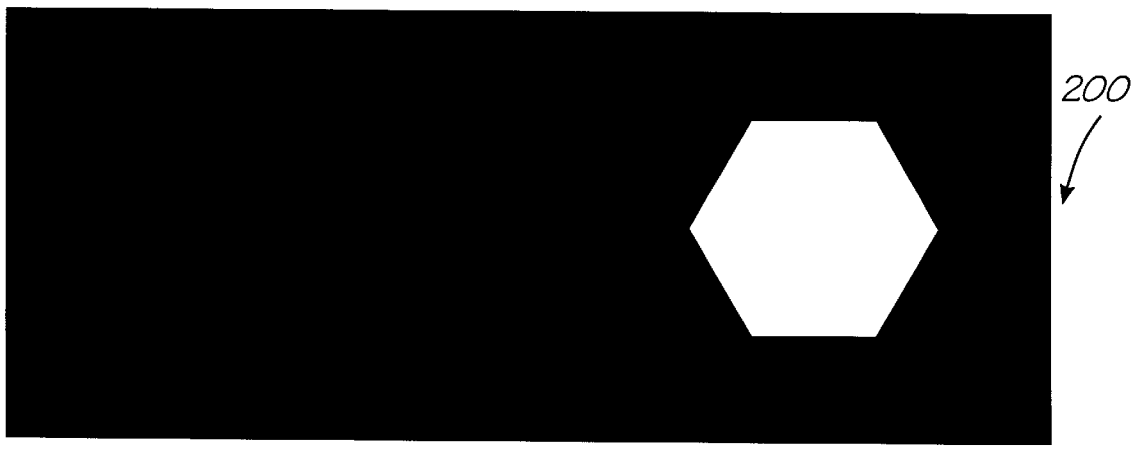
FIGS. 29a to 29k show layouts of masks used in various steps in the manufacturing process.
Figure 27B:
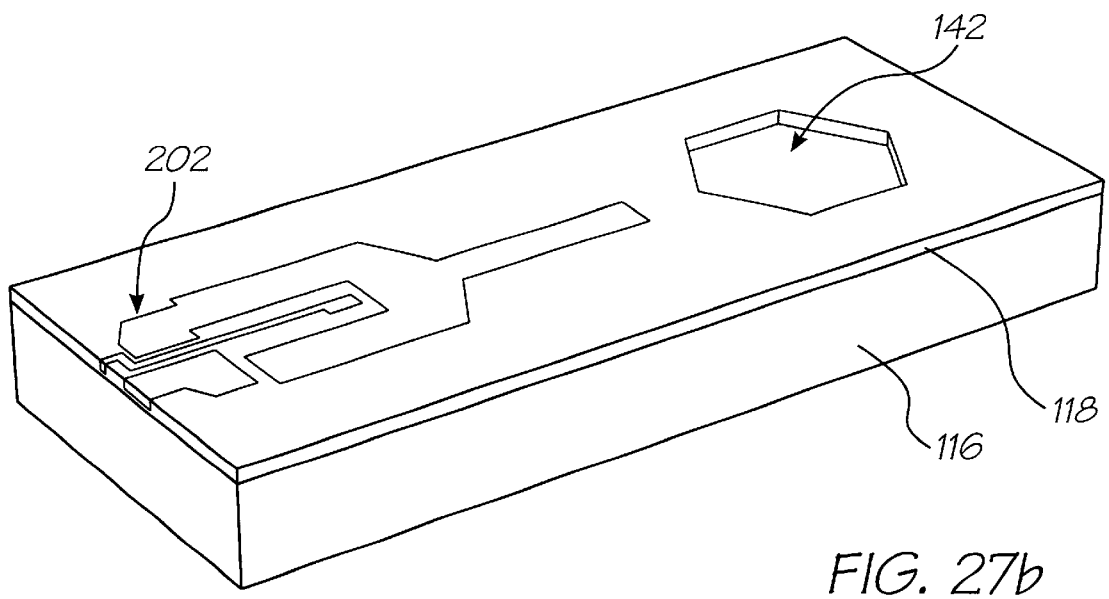
Figure 28B:
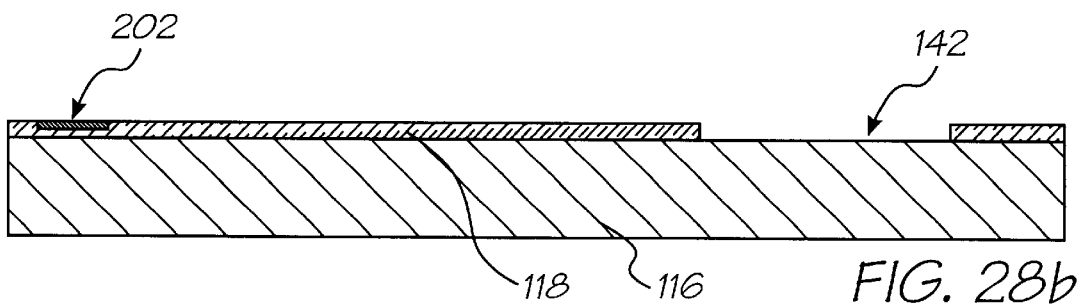
Figure 29B:
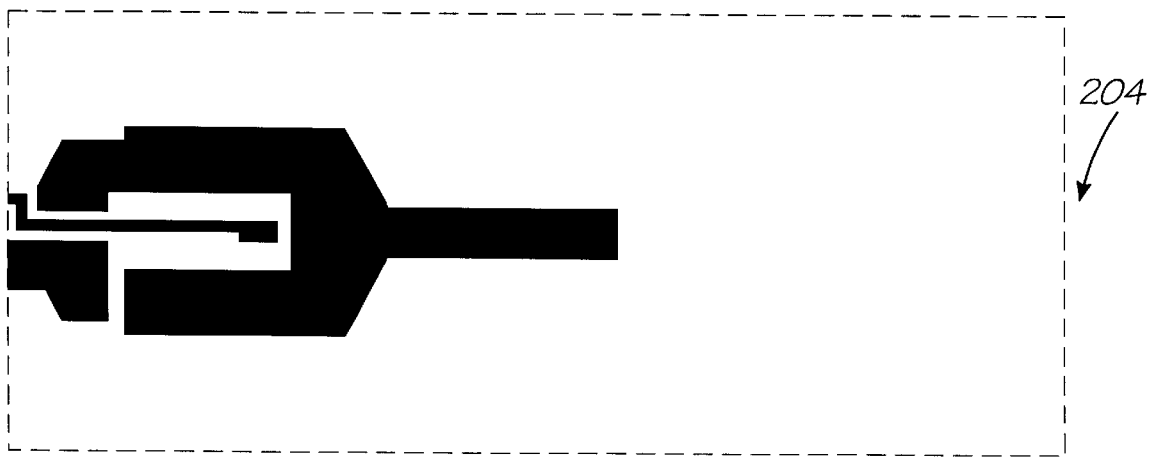
Figure 27C:
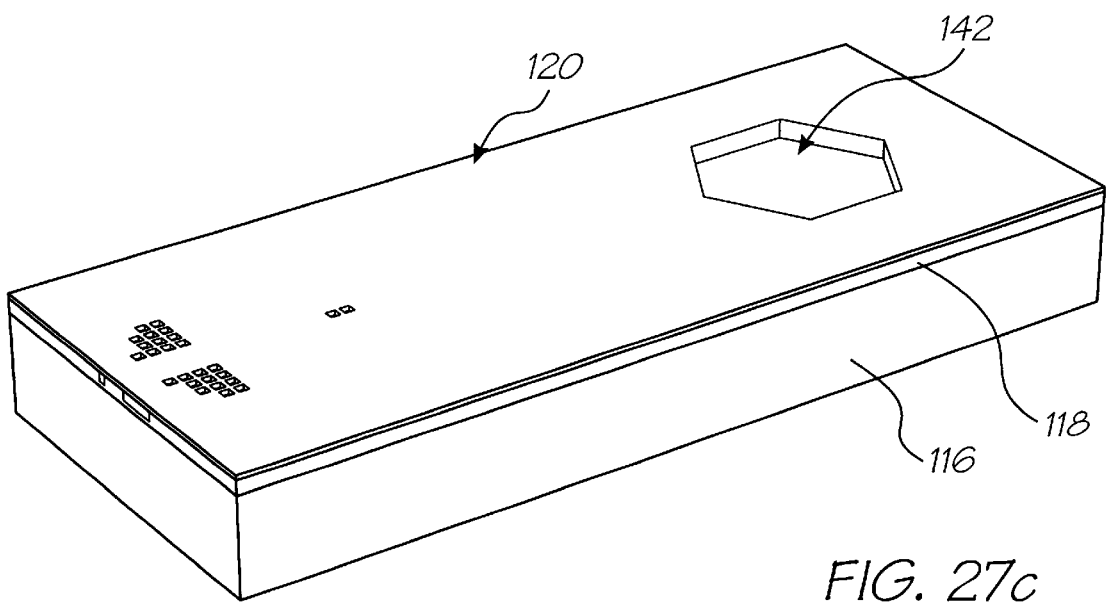
Figure 28C:
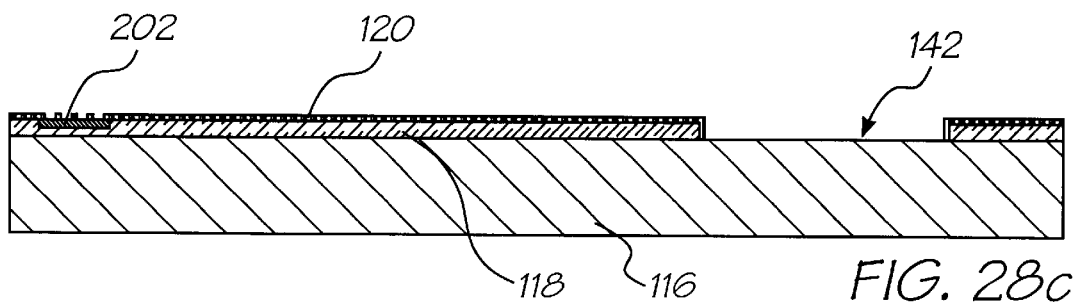
Figure 29C:
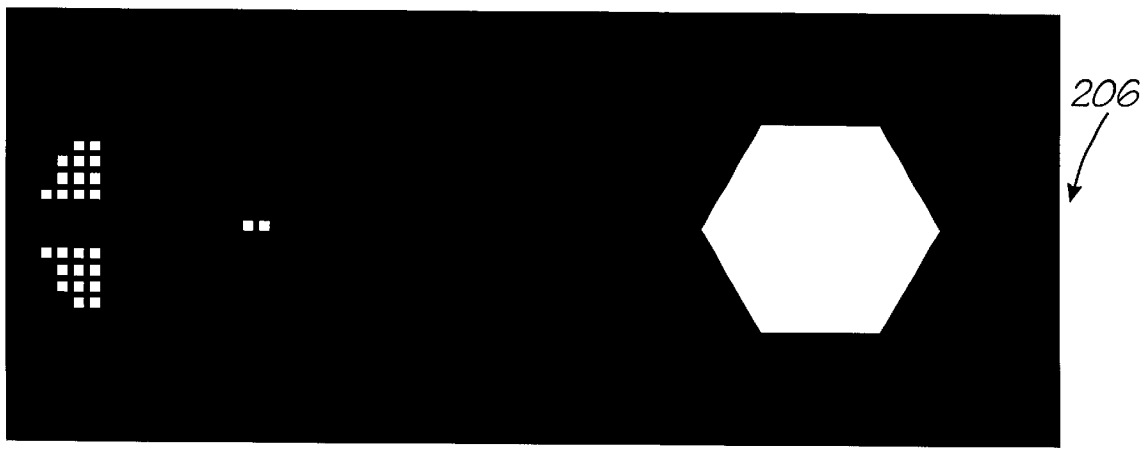
Figure 27D:
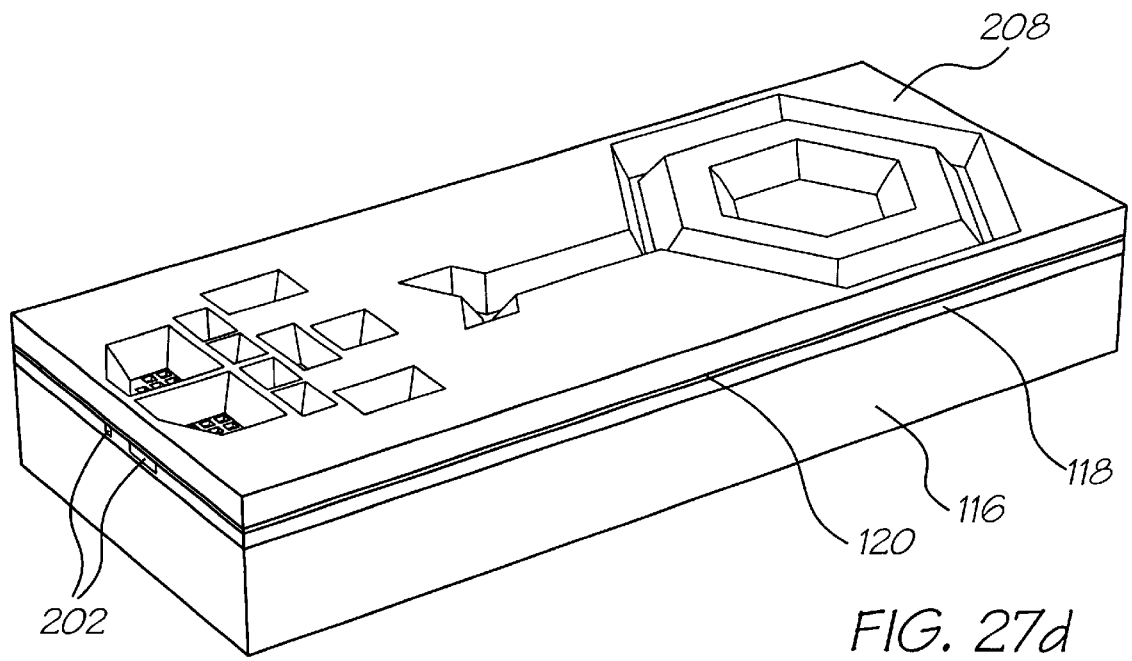
Figure 28D:
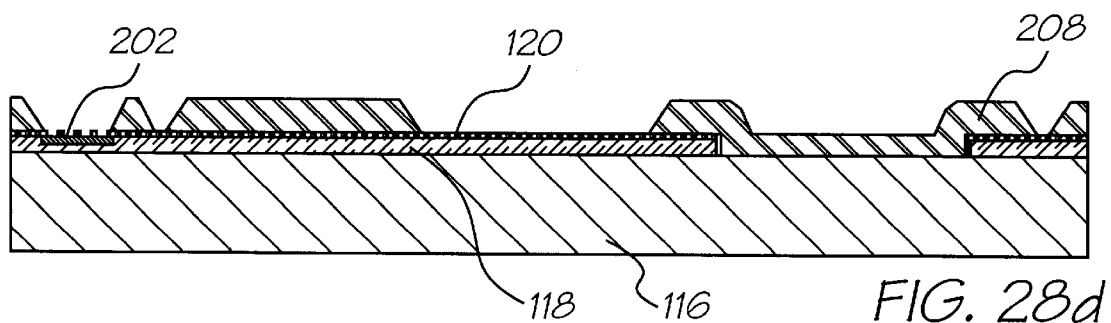
Figure 29D:
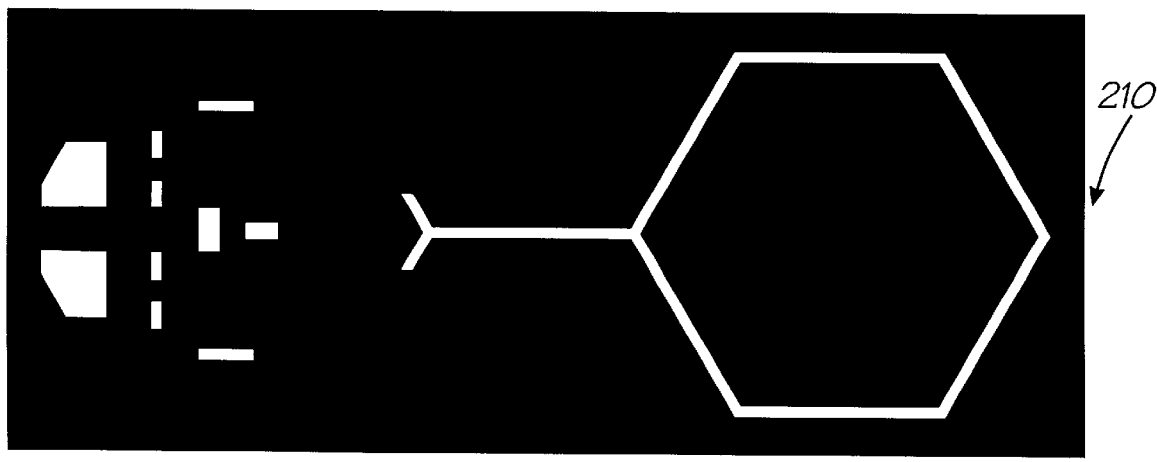

In FIG. 27b of the drawings, approximately 0.8 microns of aluminum 202 is deposited on the layer 118. Resist is spun on and the aluminum 202 is exposed to mask 204 and developed. The aluminum 202 is plasma etched down to the oxide layer 118, the resist is stripped and the device is cleaned. This step provides the bond pads and interconnects to the ink jet actuator 128. This interconnect is to an NMOS drive transistor and a power plane with connections made in the CMOS layer (not shown).

Approximately 0.5 microns of PECVD nitride is deposited as the CMOS passivation layer 120. Resist is spun on and the layer 120 is exposed to mask 206 whereafter it is developed. After development, the nitride is plasma etched down to the aluminum layer 202 and the silicon layer 116 in the region of the inlet aperture 142. The resist is stripped and the device cleaned.

A layer 208 of a sacrificial material is spun on to the layer 120. The layer 208 is 6 microns of photo-sensitive polyimide or approximately 4 $\mu$M of high temperature resist. The layer 208 is softbaked and is then exposed to mask 210 whereafter it is developed. The layer 208 is then hardbaked at 400° C. for one hour where the layer 208 is comprised of polyimide or at greater than 300° C. where the layer 208 is high temperature resist. It is to be noted in the drawings that the pattern-dependent distortion of the polyimide layer 208 caused by shrinkage is taken into account in the design of the mask 210.

Figure 27E:
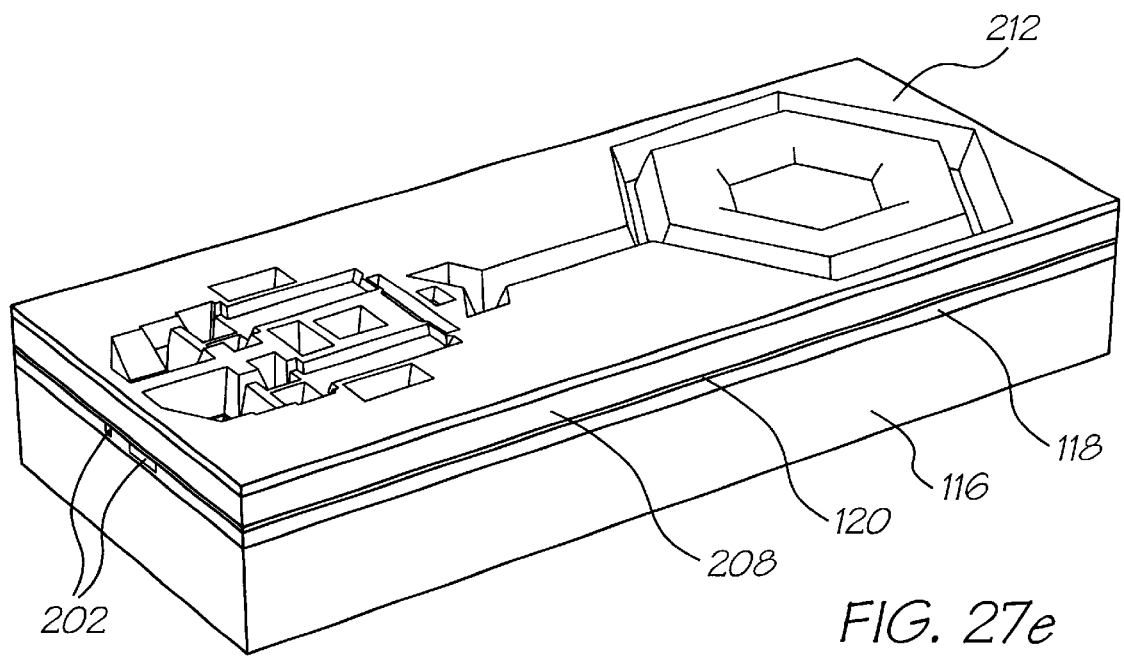
Figure 28E:
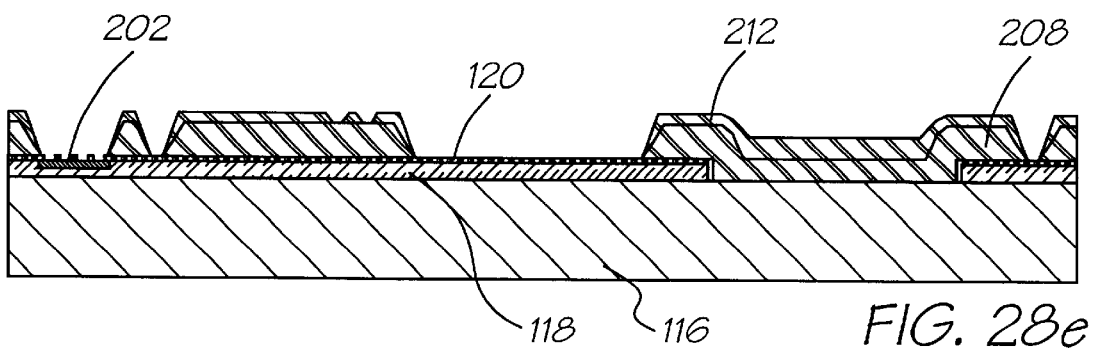
Figure 29E:
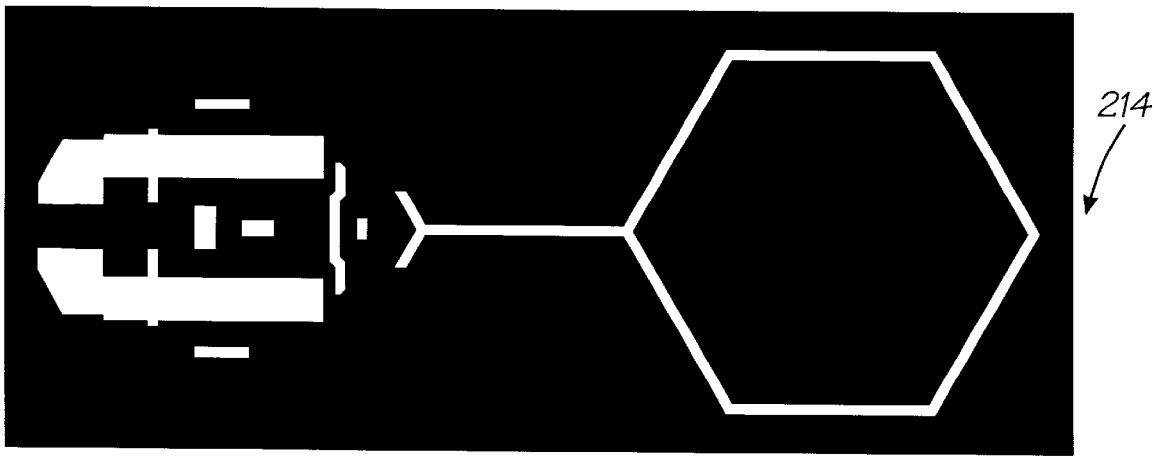
Figure 27F:
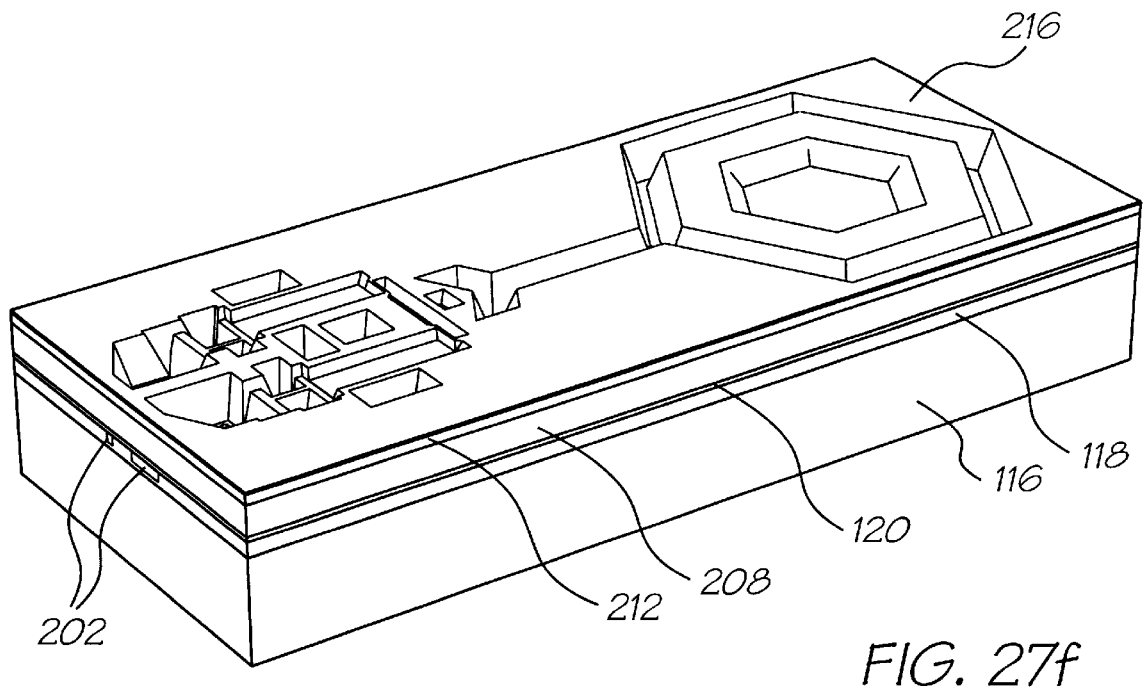
Figure 28F:
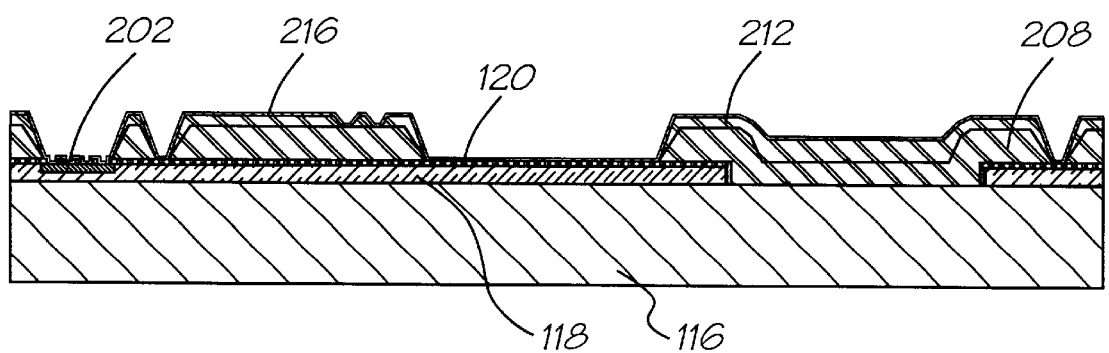
Figure 27G:
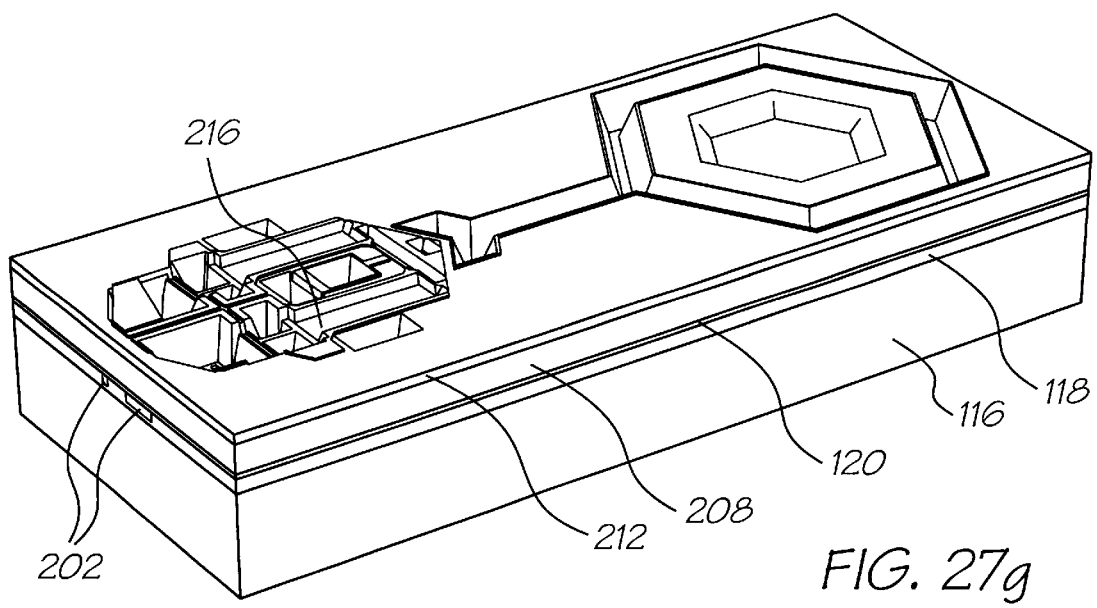
Figure 28G:
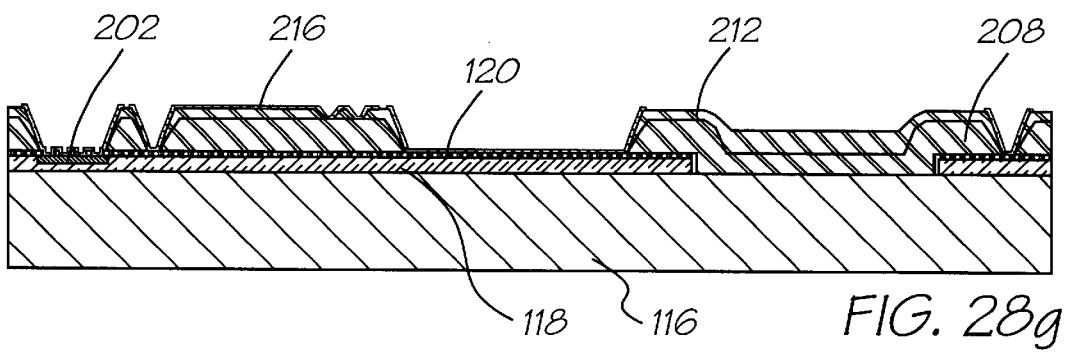
Figure 29F:
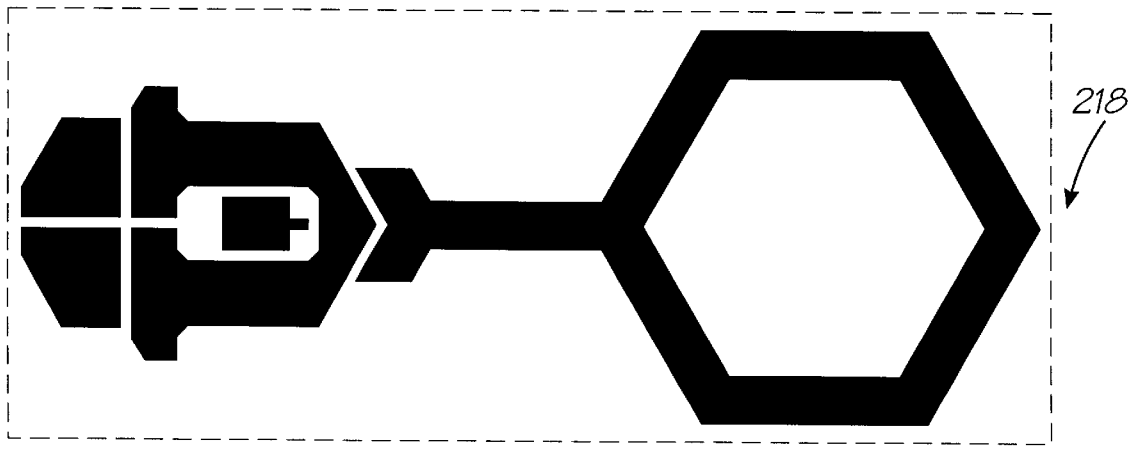
Figure 27H:
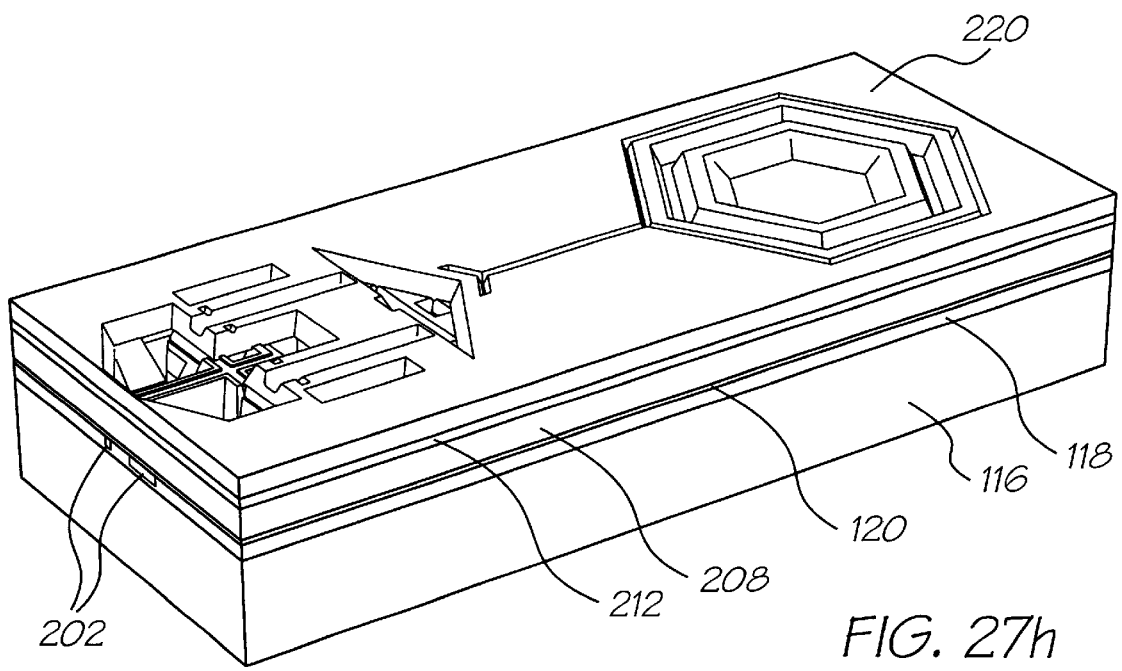
Figure 28H:
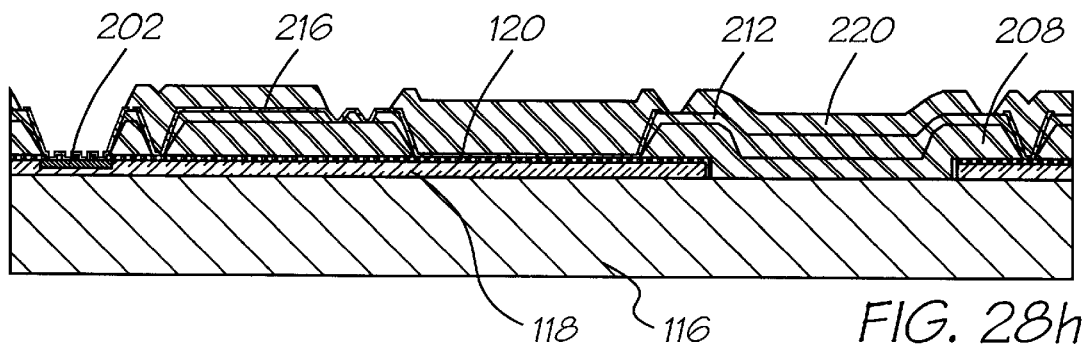
Figure 29G:
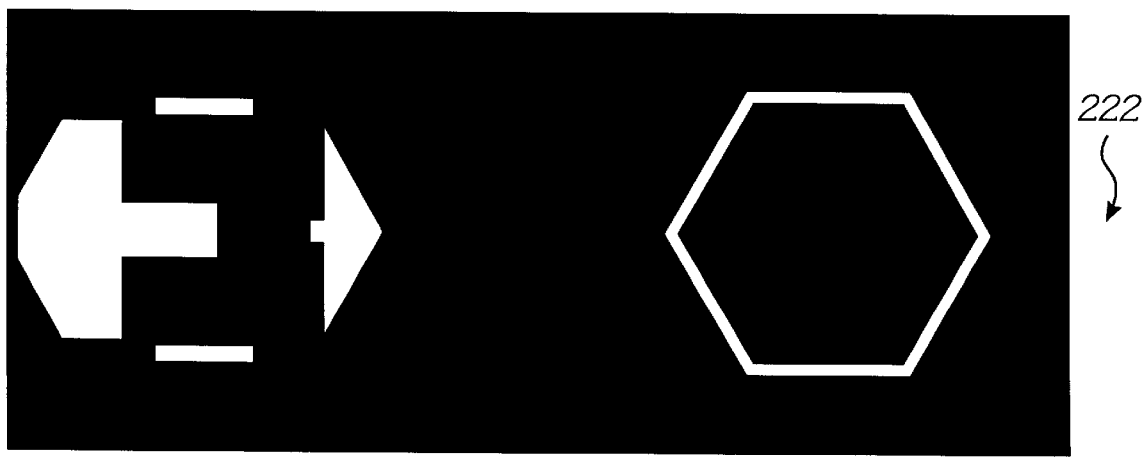
Figure 27I:
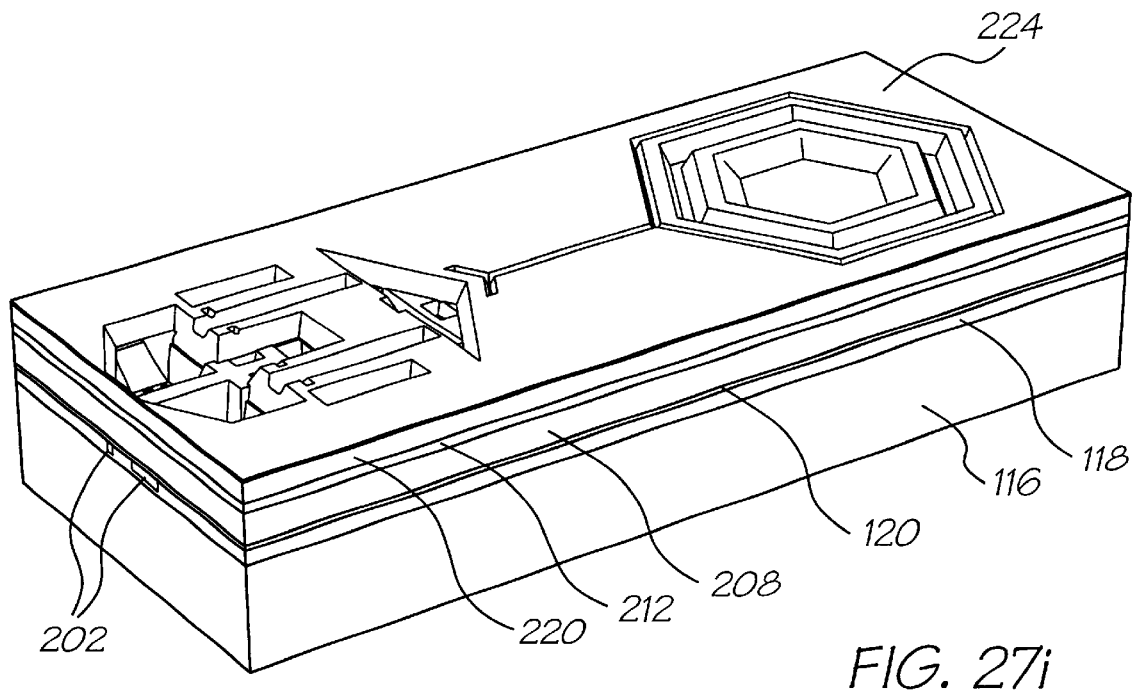
Figure 28I:
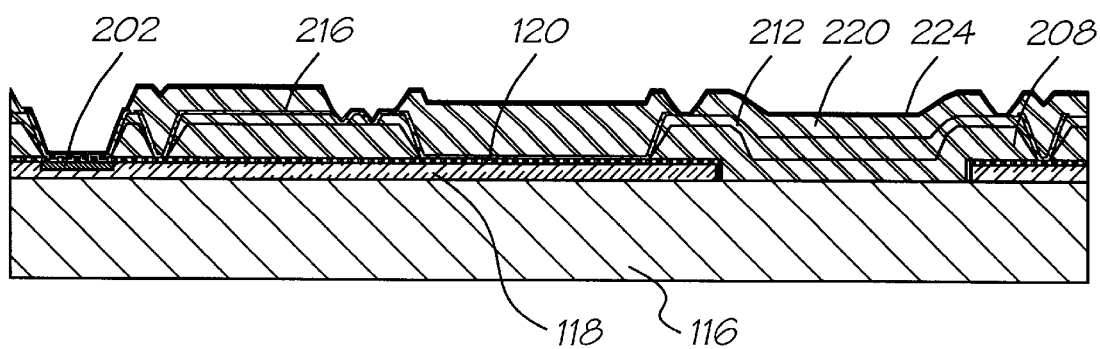
Figure 27J:
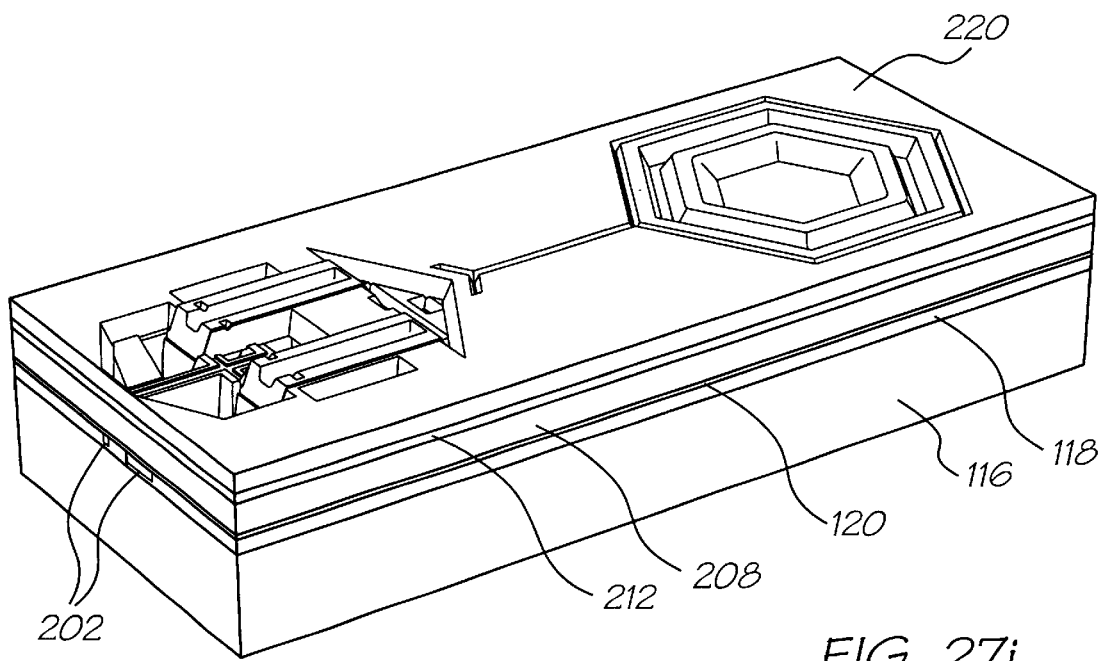
Figure 28J:
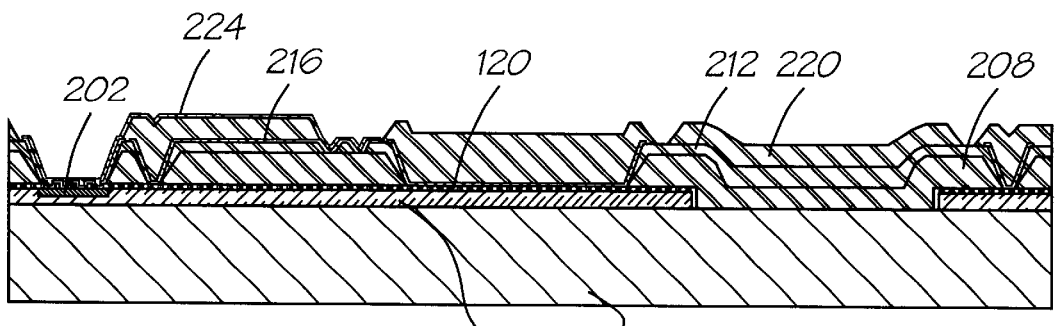
Figure 29H:
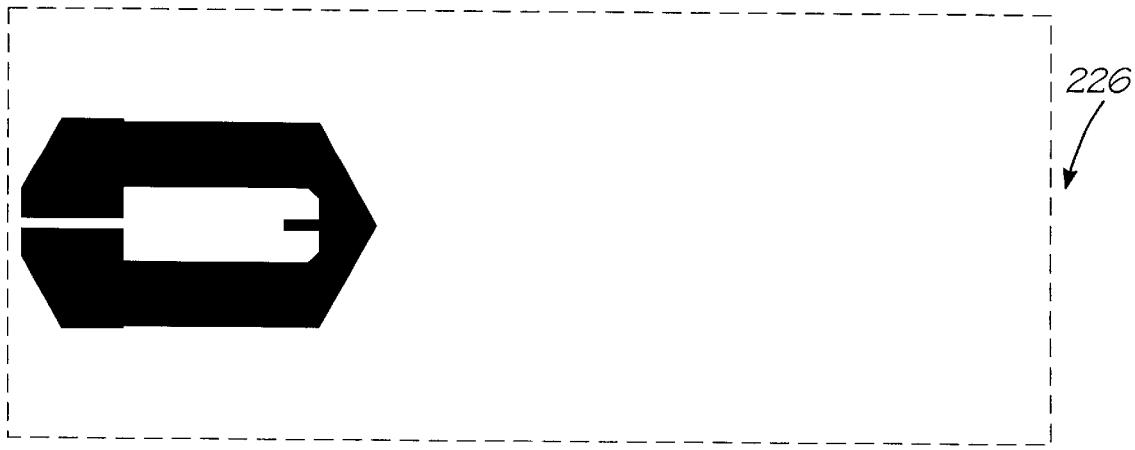
Figure 27K:
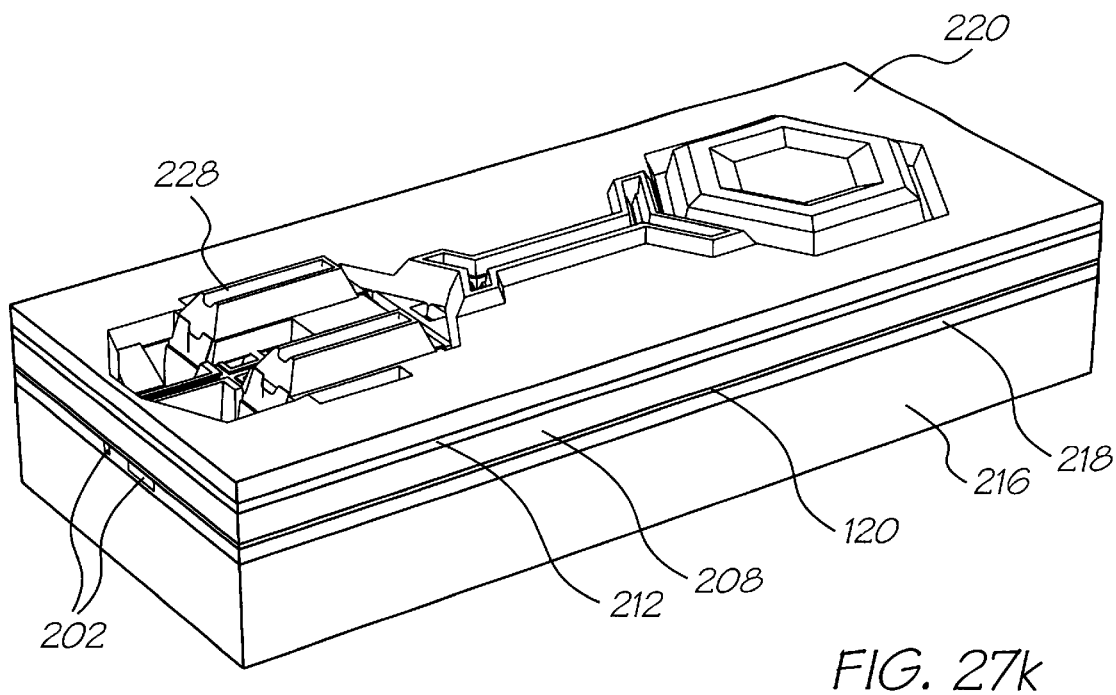
Figure 28K:
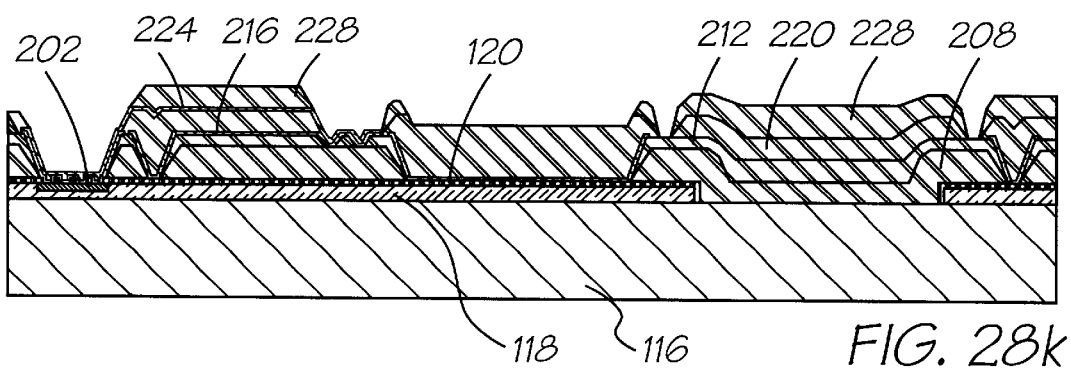
Figure 29I:
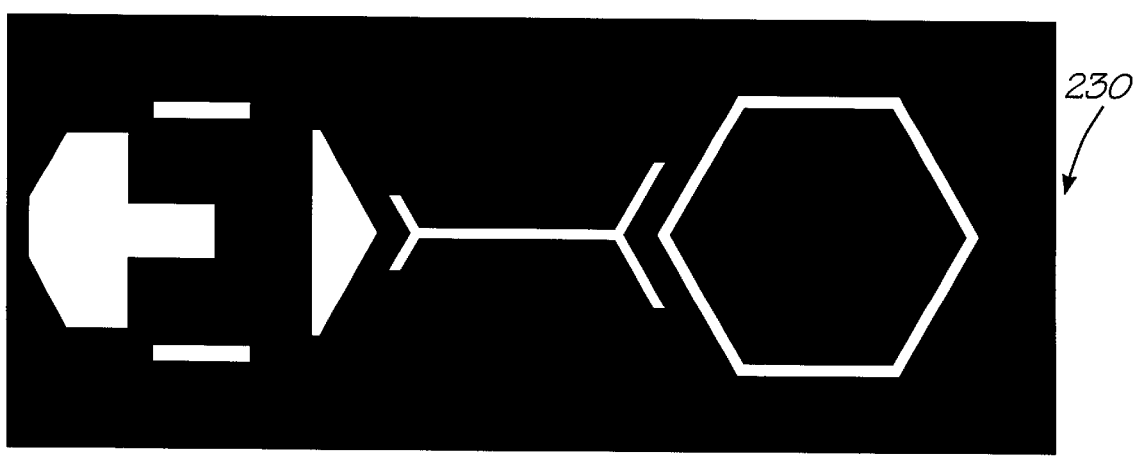
Figure 271:
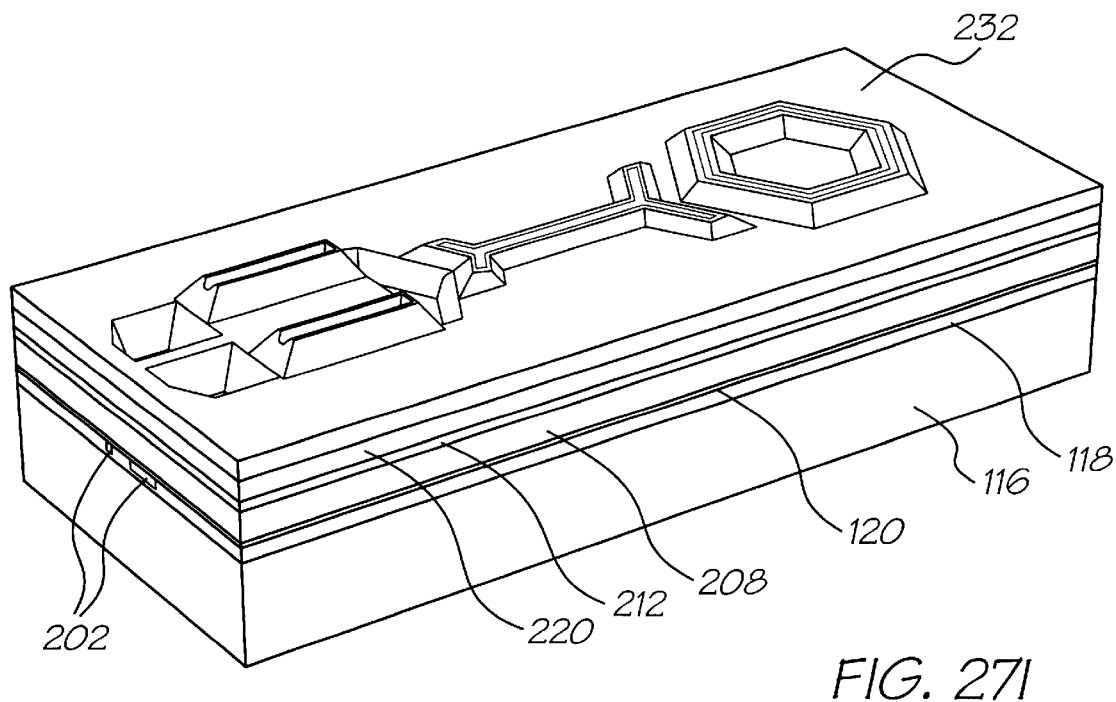
Figure 281:
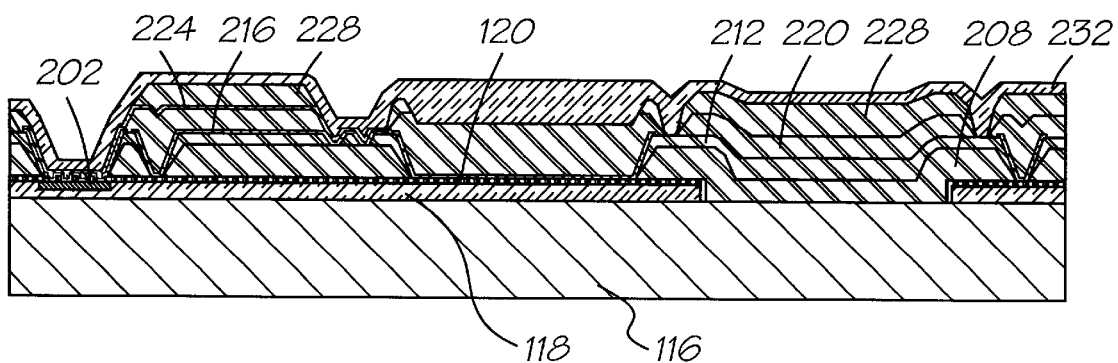
Figure 27M:
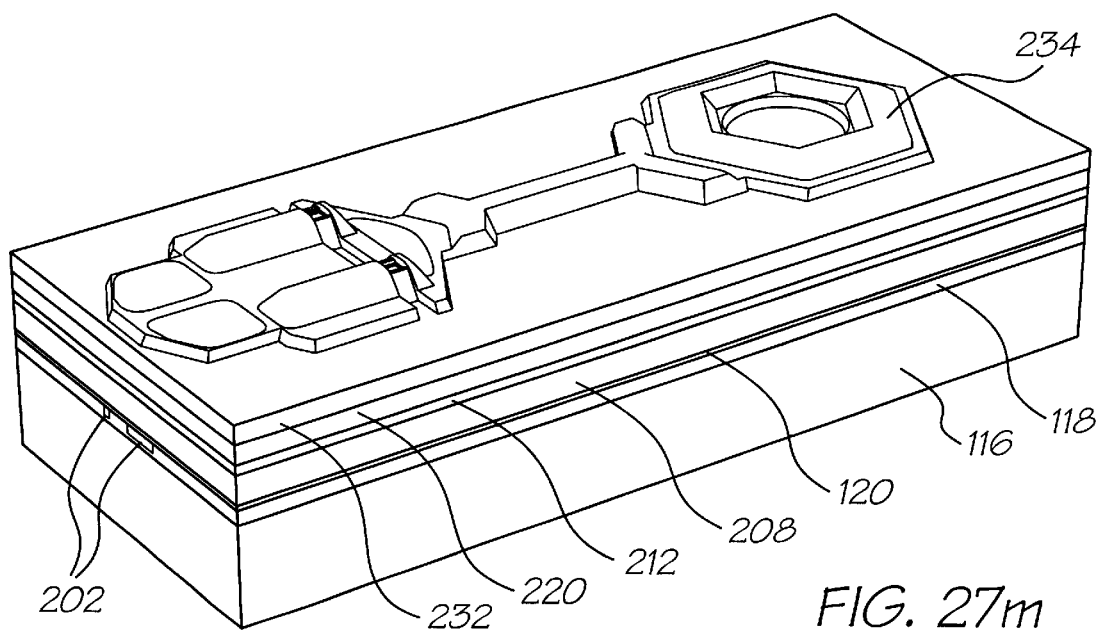
Figure 28M:
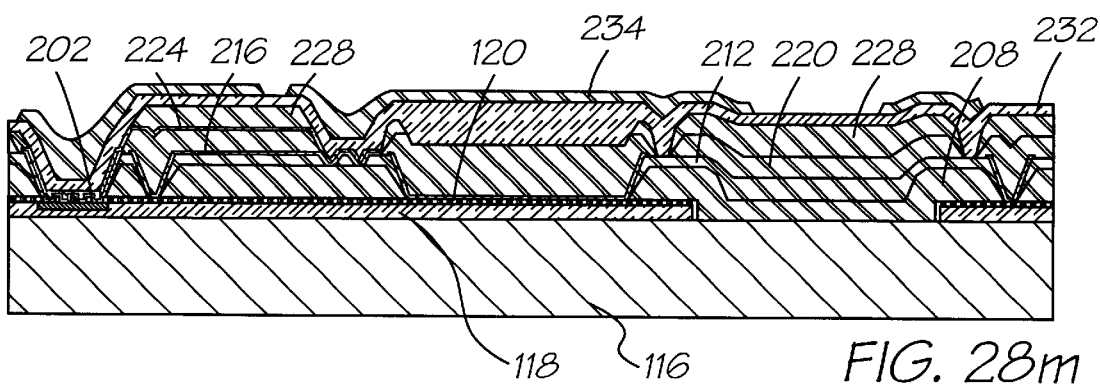
Figure 29J:
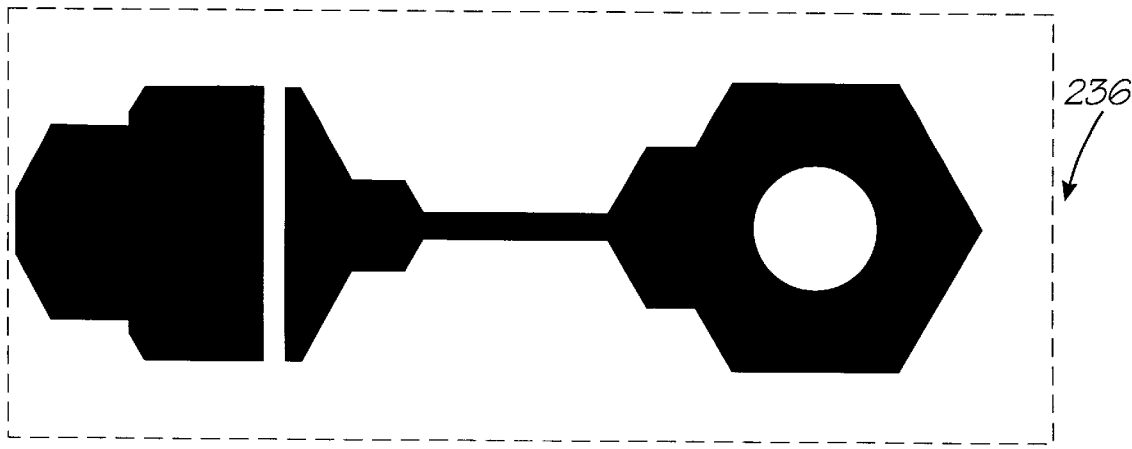
Figure 27N:
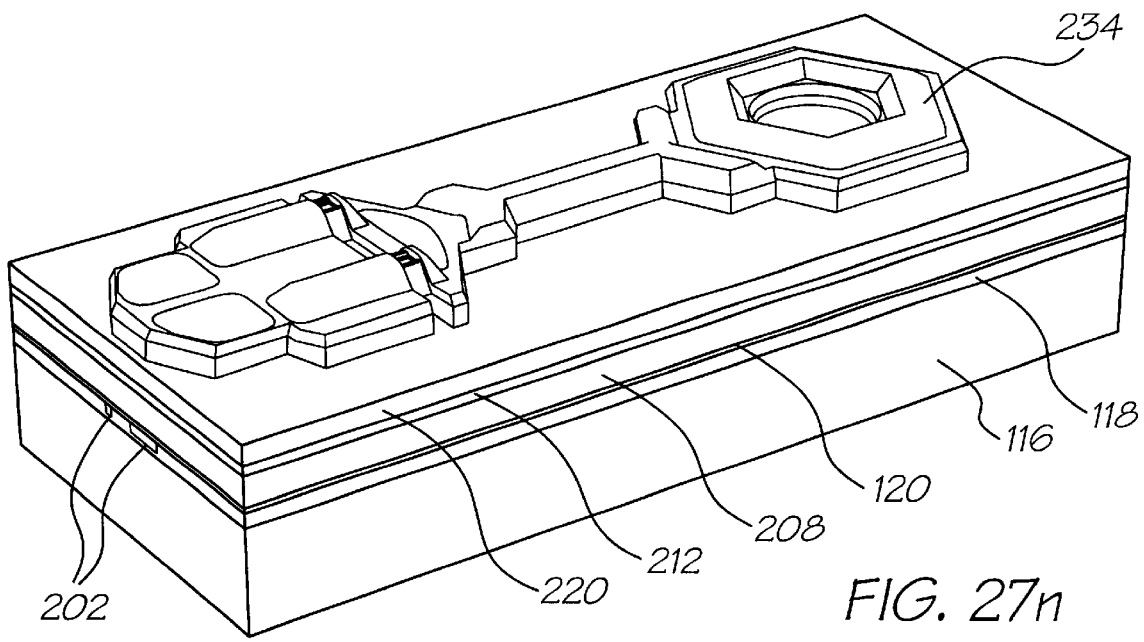
Figure 28N:
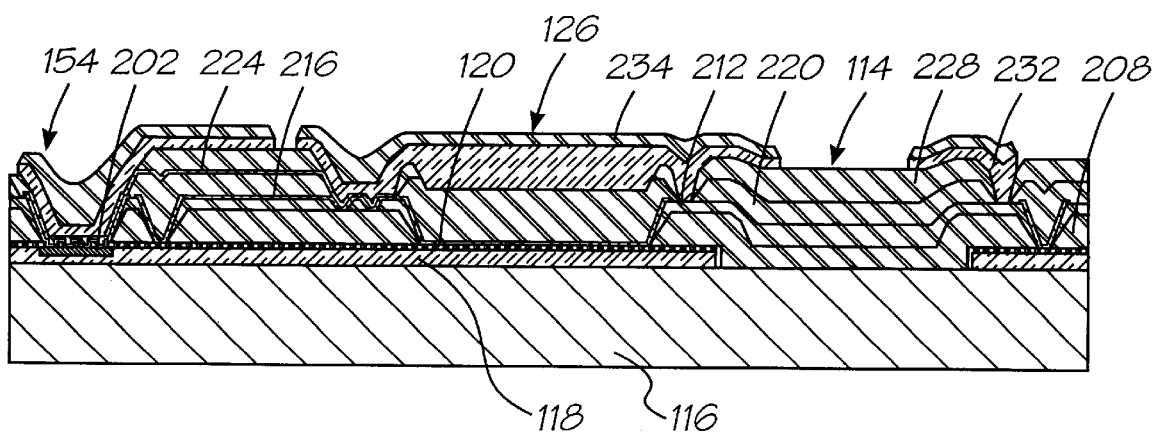
Figure 27O:
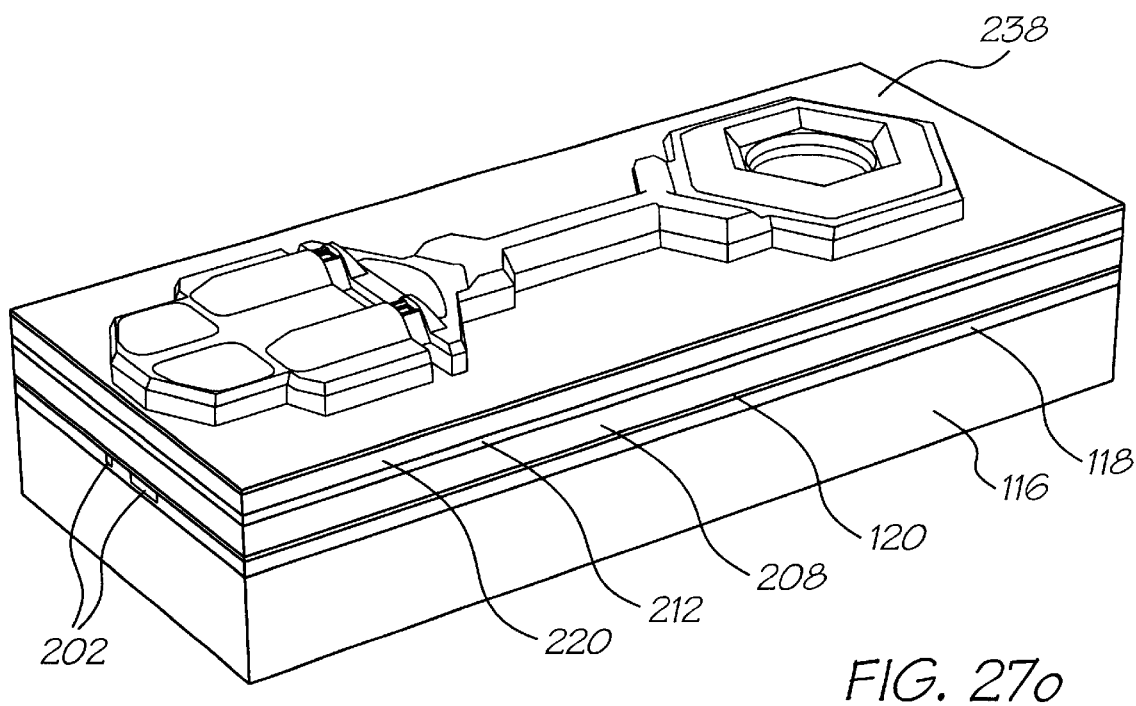
Figure 28O:
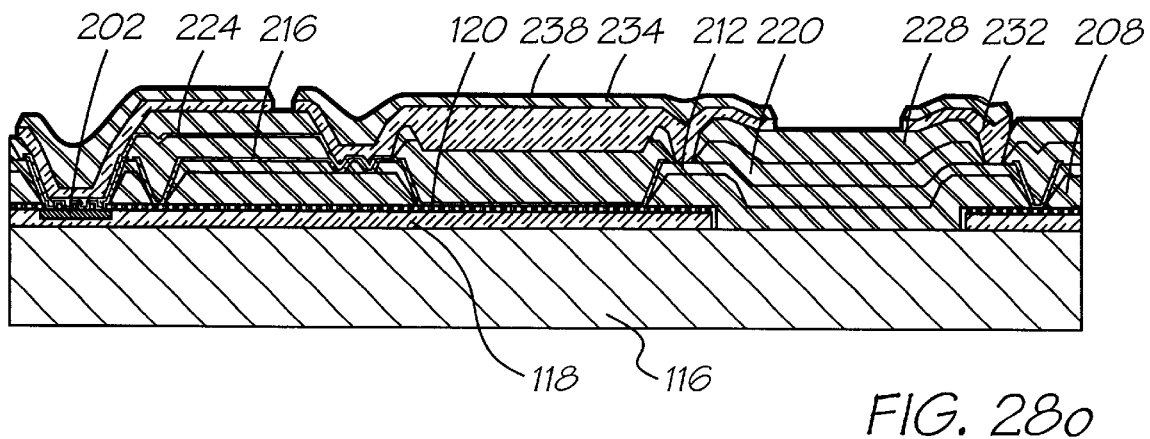

In the next step, shown in FIG. 27e of the drawings, a second sacrificial layer 212 is applied. The layer 212 is either 2 $\mu$m of photo-sensitive polyimide which is spun on or approximately 1.3 $\mu$m of high temperature resist. The layer 212 is softbaked and exposed to mask 214. After exposure to the mask 214, the layer 212 is developed. In the case of the layer 212 being polyimide, the layer 212 is hardbaked at 400° C. for approximately one hour. Where the layer 212 is resist, it is hardbaked at greater than 300° C. for approximately one hour.

A 0.2 micron multi-layer metal layer 216 is then deposited. Part of this layer 216 forms the passive beam 160 of the actuator 128.

The layer 216 is formed by sputtering 1,000 Å of titanium nitride (TiN) at around 300° C. followed by sputtering 50 Å of tantalum nitride (TaN). A further 1,000 Å of TiN is sputtered on followed by 50 Å of TaN and a further 1,000 Å of TiN.

Other materials which can be used instead of TiN are TiB$_2$, MoSi$_2$ or (Ti, Al)N.

The layer 216 is then exposed to mask 218, developed and plasma etched down to the layer 212 whereafter resist, applied for the layer 216, is wet stripped taking care not to remove the cured layers 208 or 212.

A third sacrificial layer 220 is applied by spinning on 4 $\mu$m of photo-sensitive polyimide or approximately 2.6 $\mu$m high temperature resist. The layer 220 is softbaked whereafter it is exposed to mask 222. The exposed layer is then developed followed by hardbaking. In the case of polyimide, the layer 220 is hardbaked at 400° C. for approximately one hour or at greater than 300° C. where the layer 220 comprises resist.

A second multi-layer metal layer 224 is applied to the layer 220. The constituents of the layer 224 are the same as the layer 216 and are applied in the same manner. It will be appreciated that both layers 216 and 224 are electrically conductive layers.

The layer 224 is exposed to mask 226 and is then developed. The layer 224 is plasma etched down to the polyimide or resist layer 220 whereafter resist applied for the layer 224 is wet stripped taking care not to remove the cured layers 208, 212 or 220. It will be noted that the remaining part of the layer 224 defines the active beam 158 of the actuator 128.

A fourth sacrificial layer 228 is applied by spinning on 4 $\mu$m of photo-sensitive polyimide or approximately 2.6 $\mu$m of high temperature resist. The layer 228 is softbaked, exposed to the mask 230 and is then developed to leave the island portions as shown in FIG. 9k of the drawings. The remaining portions of the layer 228 are hardbaked at 400° C. for approximately one hour in the case of polyimide or at greater than 300° C. for resist.

As shown in FIG. 27l of the drawing a high Young's modulus dielectric layer 232 is deposited. The layer 232 is constituted by approximately 1 $\mu$m of silicon nitride or aluminum oxide. The layer 232 is deposited at a temperature below the hardbaked temperature of the sacrificial layers 208, 212, 220, 228. The primary characteristics required for this dielectric layer 232 are a high elastic modulus, chemical inertness and good adhesion to TiN.

A fifth sacrificial layer 234 is applied by spinning on 2 $\mu$m of photo-sensitive polyimide or approximately 1.3 $\mu$m of high temperature resist. The layer 234 is softbaked, exposed to mask 236 and developed. The remaining portion of the layer 234 is then hardbaked at 400° C. for one hour in the case of the polyimide or at greater than 300° C. for the resist.

The dielectric layer 232 is plasma etched down to the sacrificial layer 228 taking care not to remove any of the sacrificial layer 234.

This step defines the nozzle opening 124, the lever arm 126 and the anchor 154 of the nozzle assembly 110.

A high Young's modulus dielectric layer 238 is deposited. This layer 238 is formed by depositing 0.2 $\mu$m of silicon nitride or aluminum nitride at a temperature below the hardbaked temperature of the sacrificial layers 208, 212, 220 and 228.

Figure 27P:
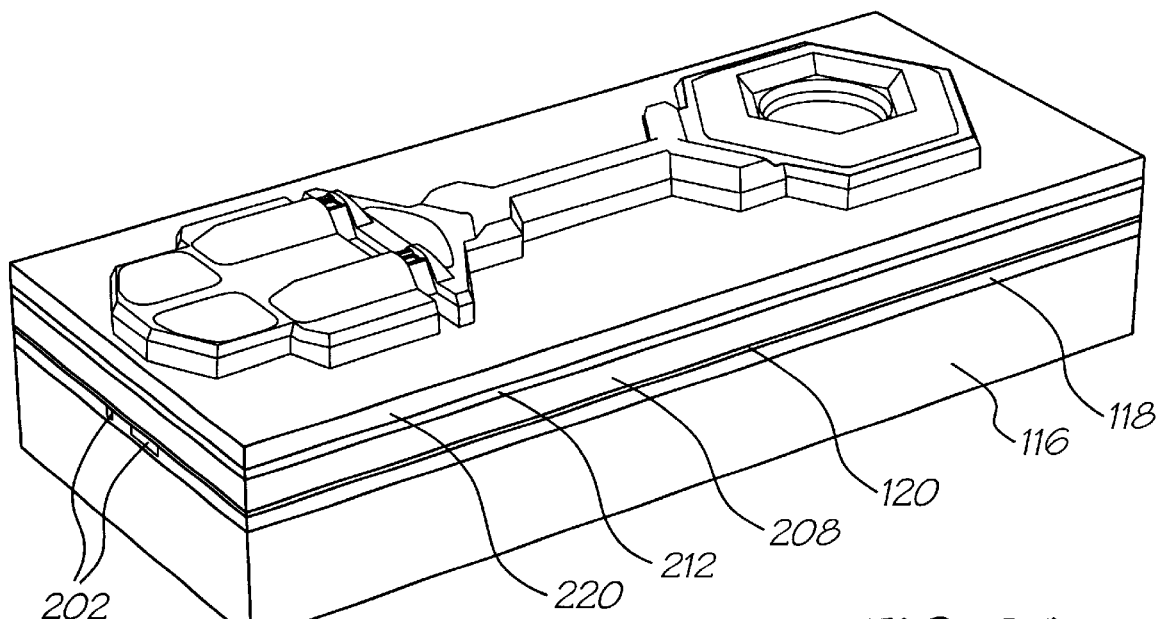
Figure 28P:
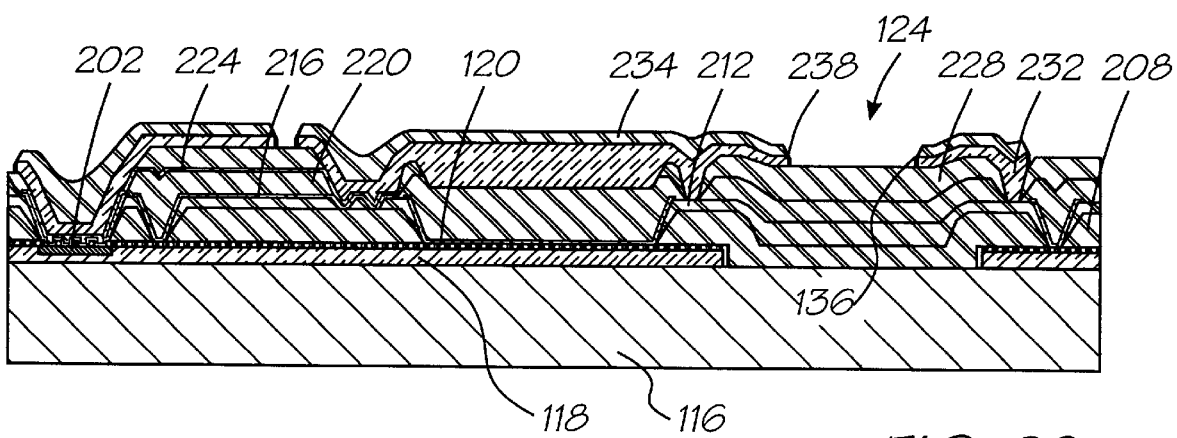
Figure 27Q:
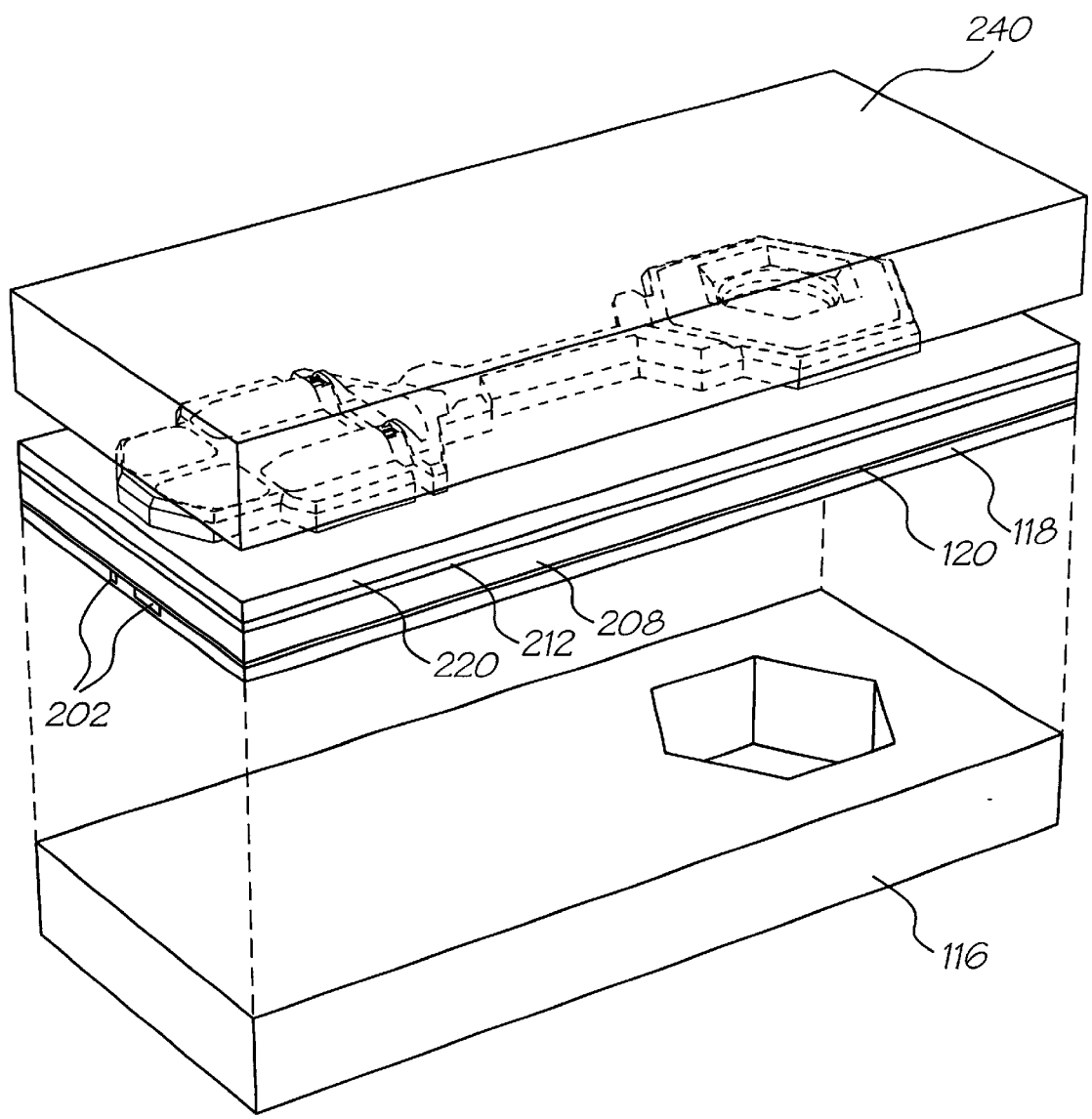
Figure 28Q:
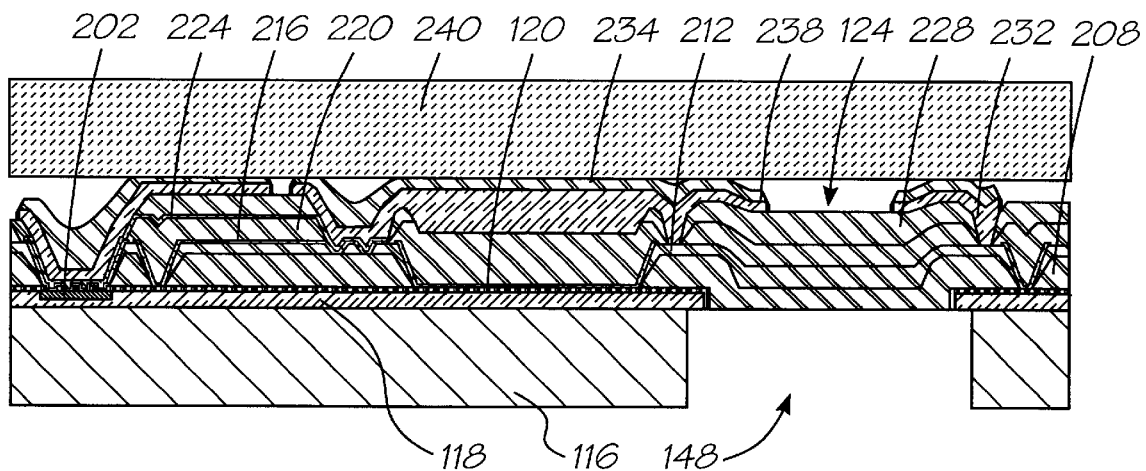
Figure 29K:
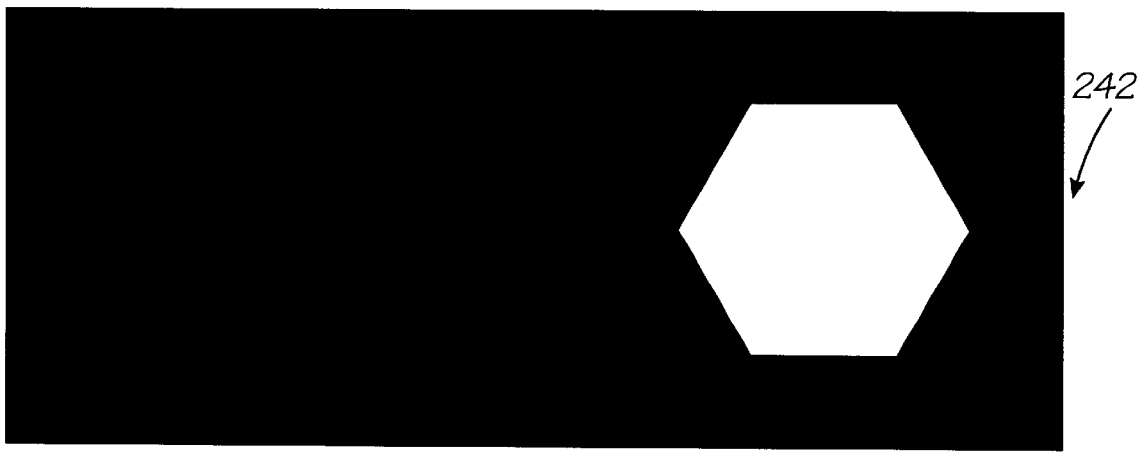

Then, as shown in FIG. 27p of the drawings, the layer 238 is anisotropically plasma etched to a depth of 0.35 microns. This etch is intended to clear the dielectric from all of the surface except the side walls of the dielectric layer 232 and the sacrificial layer 234. This step creates the nozzle rim 136 around the nozzle opening 124 which "pins" the meniscus of ink, as described above.

An ultraviolet (UV) release tape 240 is applied. 4 $\mu$m of resist is spun on to a rear of the silicon wafer 116. The wafer 116 is exposed to mask 242 to back etch the wafer 116 to define the ink inlet channel 148. The resist is then stripped from the wafer 116.

Figure 27R:
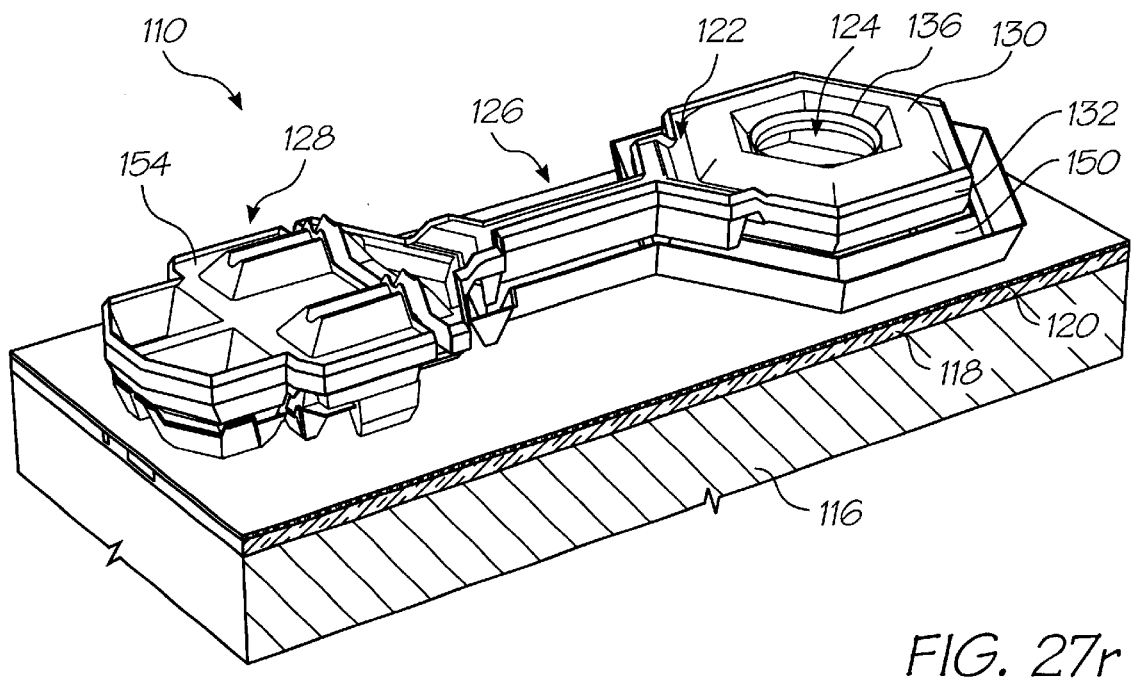
Figure 28R:
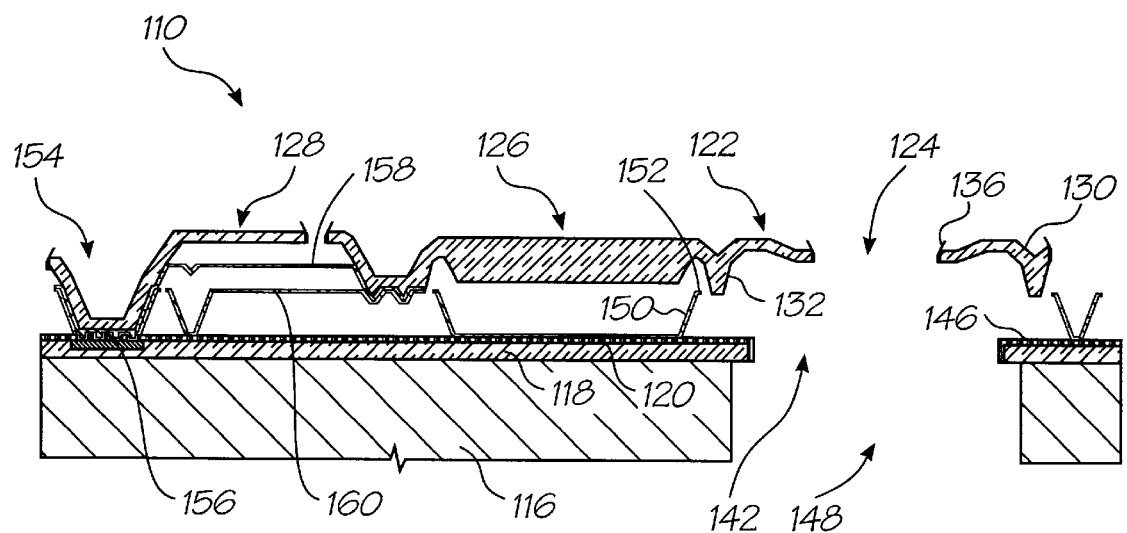
Figure 30A:
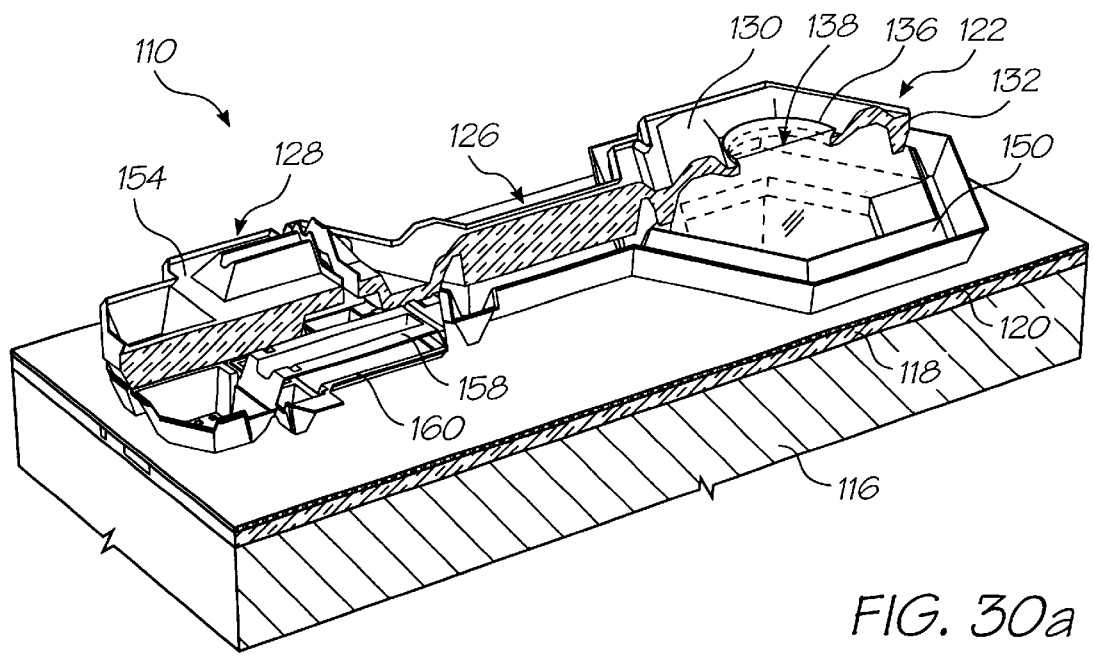
FIGS. 30a to 30c show three dimensional views of an operation of the nozzle assembly manufactured according to the method of FIGS. 27 and 28.
Figure 31A:
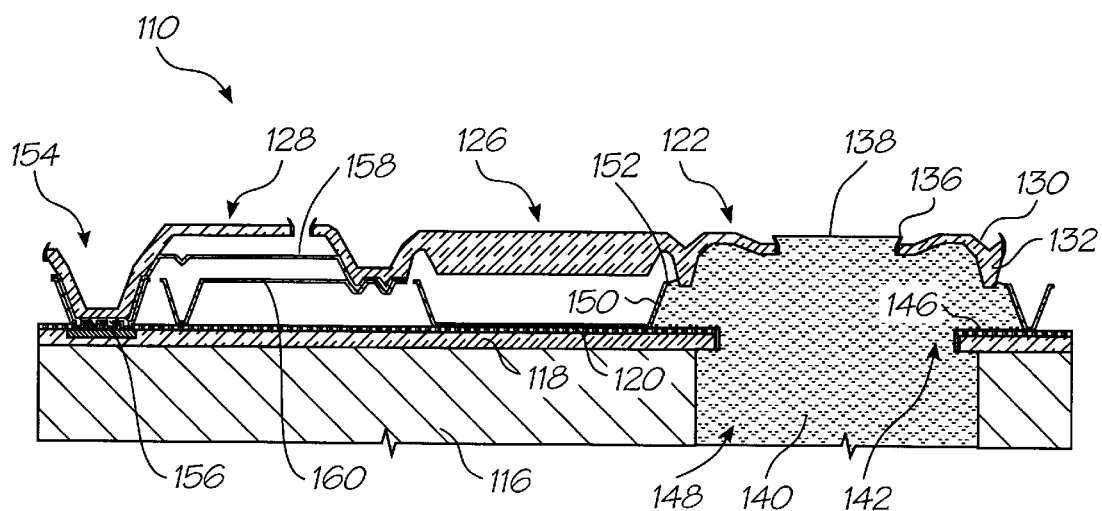
Figure 30B:
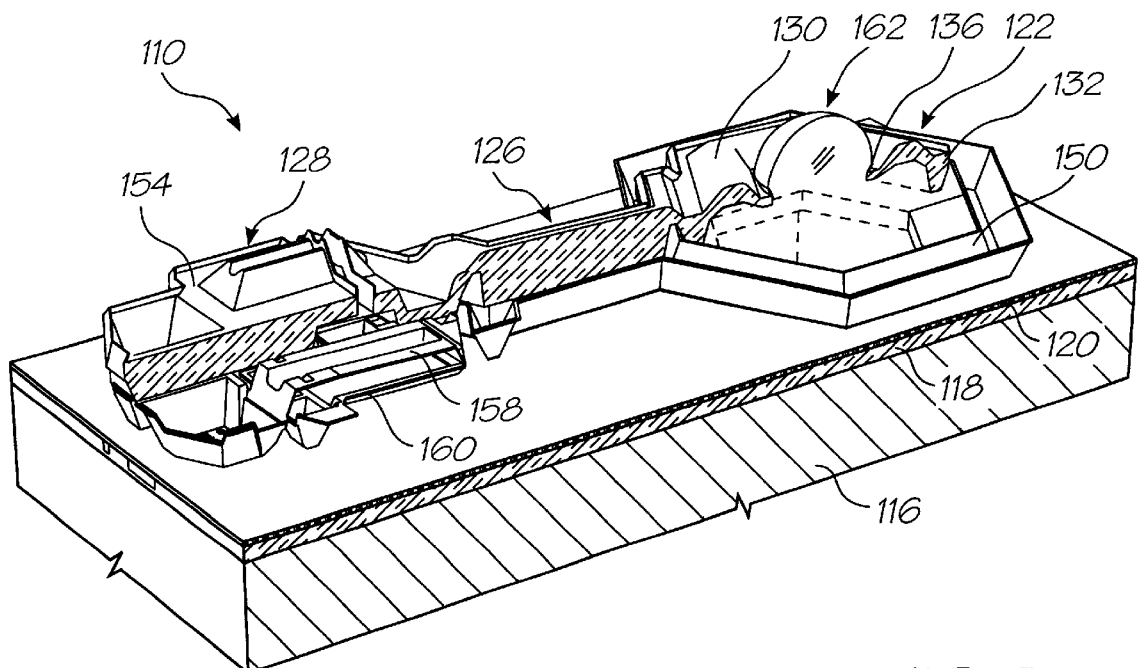
Figure 31B:
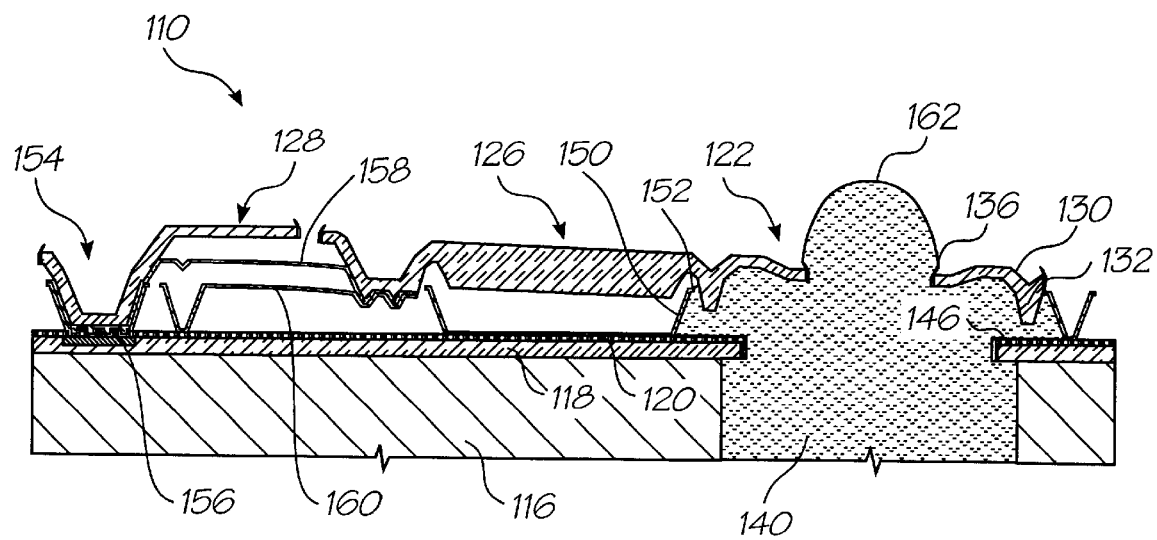
Figures 30C, 31C:
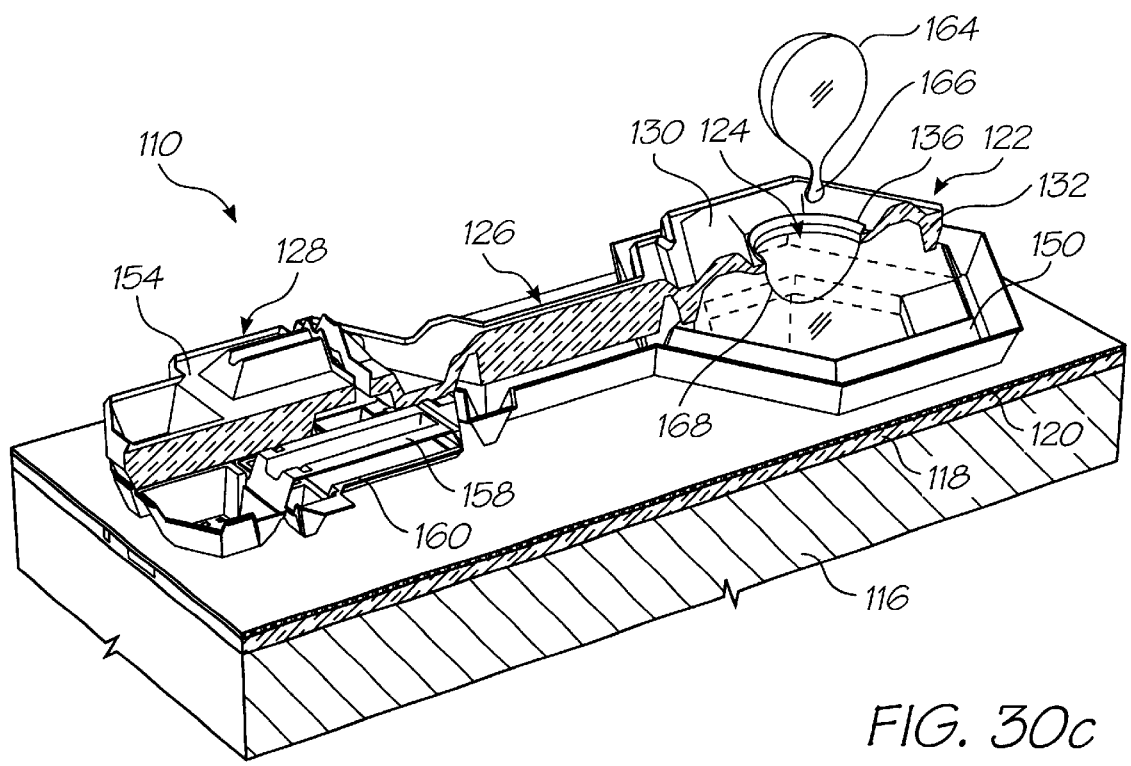

A further UV release tape (not shown) is applied to a rear of the wafer 16 and the tape 240 is removed. The sacrificial layers 208, 212, 220, 228 and 234 are stripped in oxygen plasma to provide the final nozzle assembly 110 as shown in FIGS. 27r and 28r of the drawings. For ease of reference, the reference numerals illustrated in these two drawings are the same as those in FIG. 20 of the drawings to indicate the relevant parts of the nozzle assembly 110. FIGS. 30 and 31 show the operation of the nozzle assembly 110, manufactured in accordance with the process described above with reference to FIGS. 27 and 28, and these figures correspond to FIGS. 21 to 23 of the drawings.

It would be appreciated by a person skilled in the art that numerous variations and/or modifications may be made to the present invention as shown in the specific embodiment without departing from the spirit or scope of the invention as broadly described. The present embodiment is, therefore, to be considered in all respects to be illustrative and not restrictive.

The presently disclosed ink jet printing technology is potentially suited to a wide range of printing system including: color and monochrome office printers, short run digital printers, high speed digital printers, offset press supplemental printers, low cost scanning printers high speed pagewidth printers, notebook computers with in-built pagewidth printers, portable color and monochrome printers, color and monochrome copiers, color and monochrome facsimile machines, combined printer, facsimile and copying machines, label printers, large format plotters, photograph copiers, printers for digital photographic "minilabs", video printers, PHOTO CD (PHOTO CD is a registered trade mark of the Eastman Kodak Company) printers, portable printers for PDAs, wallpaper printers, indoor sign printers, billboard printers, fabric printers, camera printers and fault tolerant commercial printer arrays.

I claim:

1. An ink jet nozzle assembly including a nozzle chamber having a nozzle through which ink from the chamber can be ejected, the chamber including a fixed portion and a movable portion configured for relative movement in an ejection phase and alternate relative movement in a refill phase, and an actuator connected with the movable portion and comprising materials having a Young's modulus greater than about 200 Gpa.

2. An ink jet nozzle assembly including:
   a nozzle chamber having an inlet in fluid communication with an ink reservoir and a nozzle through which ink from the chamber can be ejected;
   the chamber including a fixed portion and a movable portion configured for relative movement in an ejection phase and alternate relative movement in a refill phase;
   a thermal actuator connected with the movable portion and comprising materials having a high Young's modulus which produce a bending motion upon heating to effect periodically said relative movement; and
   the inlet being positioned and dimensioned relative to the nozzle such that ink is ejected preferentially from the chamber through the nozzle in droplet form during the ejection phase, and ink is alternately drawn preferentially into the chamber from the reservoir through the inlet during the refill phase;
   wherein the movable portion includes the nozzle and the fixed portion is mounted on a substrate.

3. An assembly according to claim 2 wherein the fixed portion includes the nozzle mounted on a substrate and the movable portion includes an ejection paddle.

4. An assembly according to claim 3 wherein said thermal actuator is pivoted so as to increase a degree of travel of said ejection paddle upon actuation of said thermal actuator.

5. An assembly according to claim 3 wherein said actuator is of a horse-shoe shape pivoted substantially about a midpoint thereof.

6. An assembly according to claim 5 wherein said midpoint is constructed on a wall of said chamber.

7. An assembly according to claim 6 wherein said wall comprises a thinned membrane.

8. An assembly according to claim 2 wherein said thermal actuator operates in an ambient atmosphere.

9. An assembly according to claim 2 wherein said nozzle chamber is constructed on a silicon wafer and said ink is supplied through said silicon wafer.

10. An assembly according to claim 2 wherein said thermal actuator is constructed from a thin conductive section and a substantially thicker non-conductive section.

11. An assembly according to claim 10 wherein said thin conductive section comprises substantially titanium diboride.

12. An assembly according to claim 10 wherein said thicker portion comprises substantially glass.

13. An assembly according to claim 2 wherein said nozzle chamber has walls that include a number of small sacrificial etchant holes to facilitate construction of said assembly, said holes being of a diameter sufficiently small so as to prevent an ejection of ink therethrough.

14. An assembly according to claim 2, manufactured using micro-electro-mechanical systems (MEMS) techniques.

15. An assembly according to claim 2 wherein an effective volume of the chamber is reduced in said ejection phase and enlarged in said refill phase.

* * * * *